United States Patent
Dhanda et al.

(10) Patent No.: US 9,167,557 B2
(45) Date of Patent: Oct. 20, 2015

(54) SEMI NON-DRX MODE FOR WIRELESS COMMUNICATION

(71) Applicant: Qualcomm Incorporated, San Diego, CA (US)

(72) Inventors: Mungal Singh Dhanda, Farnborough (GB); Vikrant Jain, London (GB); Philip J. Children, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 13/652,612

(22) Filed: Oct. 16, 2012

(65) Prior Publication Data

US 2013/0107723 A1    May 2, 2013

Related U.S. Application Data

(60) Provisional application No. 61/554,400, filed on Nov. 1, 2011, provisional application No. 61/560,195, filed on Nov. 15, 2011.

(51) Int. Cl.
*H04W 68/02* (2009.01)
*H04W 76/04* (2009.01)

(52) U.S. Cl.
CPC .......... *H04W 68/025* (2013.01); *H04W 76/048* (2013.01)

(58) Field of Classification Search
USPC .................................. 370/241, 211
See application file for complete search history.

(56) References Cited

U.S. PATENT DOCUMENTS

| | | |
|---|---|---|
| 2005/0048982 A1* | 3/2005 | Roland et al. ................. 455/449 |
| 2009/0146791 A1 | 6/2009 | Jantunen et al. |
| 2009/0238098 A1 | 9/2009 | Cai et al. |
| 2010/0172250 A1 | 7/2010 | Chun et al. |
| 2011/0038348 A1* | 2/2011 | Borsella et al. ............... 370/331 |
| 2011/0128901 A1 | 6/2011 | Lee et al. |

FOREIGN PATENT DOCUMENTS

| | | |
|---|---|---|
| JP | 2010506485 A | 2/2010 |
| WO | 2008054103 A | 5/2008 |
| WO | WO 2008054103 A1 * | 5/2008 |

OTHER PUBLICATIONS

Chapter II Demand and Article 34 Amendments With Response to Written Opinion—International Searching Authority (ISA/EP)—PCT/US2012/063056—May 21, 2013.
Written Opinion of the International Preliminary Examining Authority—International Preliminary Examining Authority—PCT/US2012/063056—Jan. 20, 2014.

(Continued)

*Primary Examiner* — Dang Ton
*Assistant Examiner* — Pamit Kaur
(74) *Attorney, Agent, or Firm* — QUALCOMM IP Department; James Hunt Yancey, Jr.

(57) ABSTRACT

Devices, methods, and systems for implementing semi non-DRx mode for a wireless communication device are described herein. According to some embodiments, if it is determined that semi non-DRx mode is supported by a network, a wireless communication device can enter semi non-DRx mode. The paging block on a multiframe corresponding to the wireless communication device's paging index is monitored. Other aspects, embodiments, and features are also claimed and described above.

89 Claims, 16 Drawing Sheets

(56) References Cited

OTHER PUBLICATIONS

Response to Second Written Opinion—International Preliminary Examining Authority (IPEA/EP)—PCT/US2012/063056—Feb. 19, 2014.
Notification Concerning Informal Communications With the Applicant—International Preliminary Examining Authority—PCT/US2012/063056—Mar. 18, 2014.
Response to Second Written Opinion—International Preliminary Examining Authority (IPEA/EP)—PCT/US2012/063056—Mar. 21, 2014.
Notification of Transmittal of the International Preliminary Report on Patentability—International Preliminary Examining Authority—PCT/US2012/063056—Apr. 4, 2014.
3GPP TS 24.008 V11.0.0 3rd Generation Partnership Project; Technical Specification Group Core Network and Terminals; Mobile radio interface Layer 3 specification; Core network protocols; Stage 3, Sep. 2011, Release 11.
3GPP TS 44.018 V11.0.0 3rd Generation Partnership Project; Technical Specification Group GSM/EDGE Radio Access Network; Mobile radio interface layer 3 specification; Radio Resource Control (RRC) protocol, Mar. 2012, Release 11.
3GPP TS 44.060 v11.0.0 (Mar. 2012), 3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11).
3GPP TS 45.002 V11.0.0 (Aug. 2012), 3rd Generation Partnership Project; Technical Specification Group GSM/EDGE Radio Access Network; Multiplexing and multiple access on the radio path (Release 11).
Bontu C et al., "DRX mechanism for power saving in LTE", IEEE Communications Magazine, IEEE Service Center, Piscataway, US, vol. 47, No. 6, Jun. 1, 2009, pp. 48-55, XP011281824, ISSN: 0163-6804, DOI: DOI:10.1109/MCOM.2009.5116800.
International Search Report and Written Opinion—PCT/US2012/063056—ISA/EPO—Feb. 19, 2013.
"Optimized DRX mode definition and evaluation", 3GPP TSG GERAN WG2 Meeting #43BIS, Sophia Antipolis, France, Oct. 21-23, 2009, 3GPP, FR, No. G2-0910168 Oct. 21, 2009, pp. 1-6, XP008152492.
Qualcomm Incorporated: "Optimised transfer non-DRX mode", 3GPP Draft; GP-111704—Optimised Transfer Non DRX Mode, 3rd Generation Partnership Project (3GPP), Mobile Competence Centre; 650, Route Des Lucioles ; F-06921 Sophia-Antipolis Cedex ; France, vol. TSG GERAN, No. Bratislava, Slovakia; 20111121-20111125, Nov. 16, 2011, XP050560920.
3GPP TS 45.002 V10.2.0 (Sep. 2011), 3rd Generation Partnership Project; Technical Specification Group GSM/EDGE Radio Access Network; Multiplexing and multiple access on the radio path (Release 10), 112 pp.
Japanese Office Action and Translation—Dated Jun. 15, 2015 (machine-language translation provided by JPO Counsel).

* cited by examiner

SEMI NON-DRX MODE FOR WIRELESS COMMUNICATION

RELATED APPLICATIONS AND PRIORITY CLAIMS

This application is related to and claims priority to U.S. Provisional Patent Application Ser. No. 61/554,400, filed Nov. 1, 2011, for "SEMI NON-DRX MODE," and from U.S. Provisional Patent Application Ser. No. 61/560,195, filed Nov. 15, 2011, for "SEMI-TRANSFER NON-DRX MODE," both of which are hereby incorporated herein by reference in their entireties as if fully set forth below and for all applicable purposes.

TECHNICAL FIELD

Embodiments of the present invention relate generally to communication systems, and more specifically, to systems and methods for semi non-discontinuous receive (non-DRx) mode.

BACKGROUND

Wireless communication systems have become an important means by which many people worldwide have come to communicate. A wireless communication system may provide communication for a number of subscriber stations (e.g., user equipment, mobile phones, smartphones, tablets, etc.), each of which may be serviced by a base station. A subscriber station may communicate with one or more base stations via transmissions on an uplink and a downlink. The uplink (or reverse link) refers to the communication link from the subscriber station to the base station, and the downlink (or forward link) refers to the communication link from the base station to the subscriber station.

Efficient use of power resources becomes more important as users continue to use their subscriber stations at ever increasing rates. Using power efficiently enables uninterrupted communication and better user experience. Some current systems enable subscriber station power conservation, yet at the same time cause network delay. These delays may occur when a subscriber station monitors only a specific paging channel. Delays in this current system are undesirable as they can negatively affect data transfer and user experience.

SUMMARY OF SOME EXEMPLARY EMBODIMENTS

Embodiments of the present invention address the above issues as well as others. Indeed, embodiments of the present invention provide power efficient devices, systems, and methods that can alleviate time delays. Doing so can not only utilize power resources efficiently but can aid in minimizing delays associated with network communications. Embodiments of the present invention are aimed at addressing the above discussed issues as well as others. Some sample embodiments of the present invention are summarized below. The summaries are provided for the reader's convenience yet are not to be used for limiting the full breadth of the claimed technology. Some features may not be summarized below as they are discussed in the detailed description.

Embodiments of the present invention include methods for implementing semi non-DRx mode for a wireless communication device. Such a method can generally comprise determining that semi non-DRx mode is supported by a network; entering semi non-DRx mode; and monitoring a paging block on a multiframe corresponding to the wireless communication device's paging index. The multiframe can be a 51-multiframe. The paging block can correspond to the wireless communication device's paging group determined by broadcast parameters. Also, the paging block can correspond to the wireless communication device's paging group determined by an international mobile subscriber identity of the wireless communication device.

Method embodiments can also include other features. For example, a method can include starting a semi non-DRx timer; determining that the semi non-DRx timer has expired; entering DRx mode; monitoring a broadcast control channel block on the multiframe; and monitoring only a radio block on the multiframe corresponding to the wireless communication device's paging index and paging group. The semi non-DRx timer can be the minimum of: (a) a NON-DRX-TIMER-MAX parameter and a NON-DRX-TIMER parameter; (b) a SEMI-NON-DRX-TIMER-MAX parameter and a SEMI-NON-DRX-TIMER parameter; (c) a NON-DRX-TIMER-MAX parameter and a SEMI-NON-DRX-TIMER parameter; or (d) a SEMI-NON-DRX-TIMER-MAX parameter and a NON-DRX-TIMER parameter. Also, the semi non-DRx timer can be the minimum of a first semi non-DRx timer supported by the wireless communication device and a second semi non-DRx timer supported by the network.

Method embodiments can also include additional timer features. For example, the semi non-DRx timer can be provided by the network, the semi non-DRx timer can be fixed, and the semi non-DRx timer can be a new timer. Also, methods can include receiving a Radio Link Control/Medium Access Control message to indicate the use of semi non-DRx mode. Method embodiments can be performed by a wireless communication device.

Other methods can implement semi non-DRx mode for a wireless communication network. Such a method can generally include receiving a request to send data to a wireless communication device; determining that the wireless communication network and the wireless communication device support semi non-DRx mode; determining that the wireless communication device is in semi non-DRx mode; and sending an assignment to the wireless communication device over a paging block corresponding to the wireless communication device's paging index; and sending pages to the wireless communication device over a paging block corresponding to the wireless communication device's paging index.

Embodiments of the present invention can also include wireless devices. A wireless device configured for implementing semi non-DRx mode can generally comprise a processor, memory in electronic communication with the processor; and instructions stored in the memory. The instructions can be executed by the processor to: determine that semi non-DRx mode is supported by a network; enter semi non-DRx mode; and monitor a paging block on a multiframe corresponding to the wireless communication device's paging index.

Other embodiments can also include a wireless device configured for implementing semi non-DRx mode. Such a device can generally include a processor; memory in electronic communication with the processor; and instructions stored in the memory. The instructions can be executable by the processor to: receive a request to send data to a wireless communication device; determine that a network and the wireless communication device support semi non-DRx mode; determine that the wireless communication device is in semi non-DRx mode; asend an assignment to the wireless communication device over a paging block corresponding to the wireless communication device's paging index; and send pages to the wireless communication device over a paging block corresponding to the wireless communication device's paging index. Some embodiments of the present invention can include a computer-program product for implementing semi non-DRx mode for a wireless communication device. A computer-program product can comprising a non-transitory computer-readable medium having instructions thereon. The instructions can comprise code for causing the wireless communication device to determine that semi non-DRx mode is supported by a network; code for causing the wireless communication device to enter semi non-DRx mode; and code for causing the wireless communication device to monitor a paging block on a multiframe corresponding to the wireless communication device's paging index.

Still yet further embodiments can include a wireless device that comprises a communications interface and a processor. The communications interface can receive and transmit wireless data. The processor can be operatively coupled to the communications interface and be configured to enter a semi non-DRx mode and monitor pages of a paging block on a multiframe corresponding to a paging index of a wireless communication device. The pages in semi non-DRx mode can be read more frequently than in non-DRx mode and less frequently than in DRx mode.

Additional embodiments can include a computer-program product for implementing semi non-DRx mode for a wireless communication network. The computer-program product can comprise a non-transitory computer-readable medium having instructions thereon. The instructions can comprise code for causing a wireless device to receive a request to send data to a wireless communication device; code for causing the wireless device to determine that the wireless communication network and a wireless communication device support semi non-DRx mode; code for causing the wireless device to determine that the wireless communication device is in semi non-DRx mode; code for causing the wireless device to send an assignment to the wireless communication device over a paging block corresponding to the wireless communication device's paging index; and code for causing the wireless device to send pages to the wireless communication device over a paging block corresponding to the wireless communication device's paging index.

Additional method embodiments can provide a method for implementing semi non-DRx mode for a wireless communication device. The method can comprise entering a semi non-DRx mode; and monitoring pages of a paging block on a multiframe corresponding to a paging index of a wireless communication device. Pages of a paging block can be read more frequently in semi non-DRx mode than in non-DRx mode and less frequently than in DRx mode.

Still yet additional embodiments can include a computer-program product for implementing semi non-DRx mode for a wireless communication device. The computer-program product can comprise a non-transitory computer-readable medium having instructions thereon. The instructions can comprise code for causing the wireless communication device to enter a semi non-DRx mode; and code for causing the wireless communication device to monitor pages of a paging block on a multiframe corresponding to a paging index of the wireless communication device. Pages a paging block can be read more frequently in semi non-DRx mode than in non-DRx mode and less frequently than in DRx mode.

Embodiments of the present invention can also include a wireless communication device configured for implementing semi non-DRx mode. Such a device can comprise means for determining that semi non-DRx mode is supported by a network; means for entering semi non-DRx mode; and means for monitoring a paging block on a multiframe corresponding to the wireless communication device's paging index.

Yet additional embodiments can include a wireless device configured for implementing semi non-DRx mode. Such devices can include means for receiving a request to send data to a wireless communication device; means for determining that the wireless communication network and the wireless communication device support semi non-DRx mode; means for determining that the wireless communication device is in semi non-DRx mode; means for sending an assignment to the wireless communication device over a paging block corresponding to the wireless communication device's paging index; and means for sending pages to the wireless communication device over a paging block corresponding to the wireless communication device's paging index.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

More and more people are using wireless communication devices, such as, for example, mobile phones, not only for voice but also for data communications. In the GSM/EDGE (Global System for Mobile Communications/Enhanced Data rates for GSM Evolution) Radio Access Network (GERAN) specification, General Packet Radio Service (GPRS) and Enhanced General Packet Radio Service (EGPRS) provide data services. The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services.

The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

Figure 1:
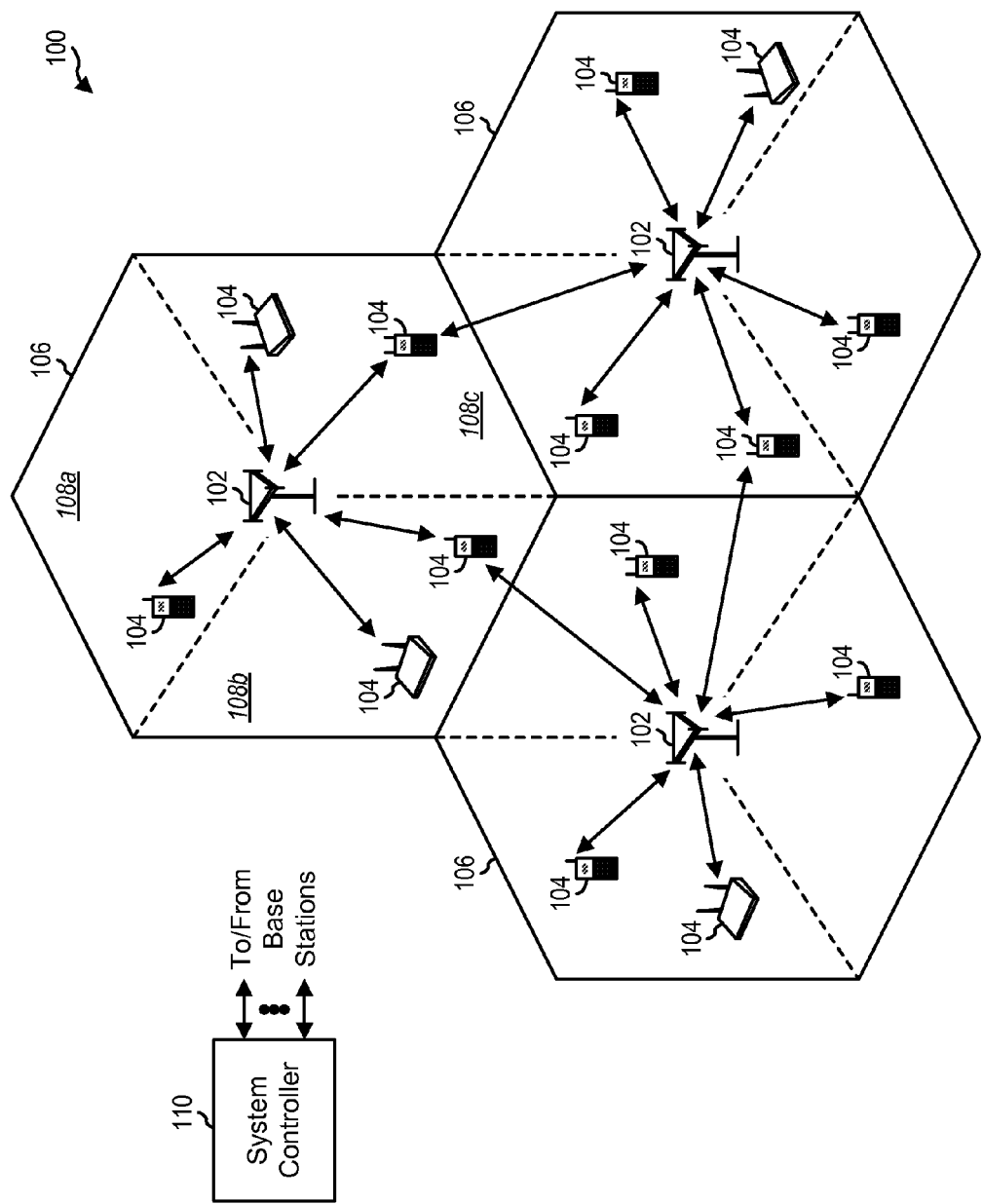
FIG. 1 illustrates an example of a wireless communication system in which embodiments of the present invention disclosed herein may be utilized.

FIG. 1 illustrates an example of a wireless communication system 100 in which the systems and methods disclosed herein may be utilized. The wireless communication system 100 includes multiple base stations (BS) 102 and multiple wireless communication devices 104. Each base station 102 provides communication coverage for a particular geographic area 106. The term "cell" can refer to a base station 102 and/or its coverage area 106 depending on the context in which the term is used.

As used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers, personal computers, machine type communication (MTC) devices, machine-to-machine (M2M) devices and sensor devices (including, for example, so-called "smart-meters," alarms and health monitoring devices). A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), an MTC device or an M2M device, or some other similar terminology. Although the term MTC device is used below to illustrate the gains that may be achieved in MTC devices, gains may also be achieved for other wireless communication devices 104 as well.

The term "base station" refers to a wireless communication station that is installed at a fixed location and used to communicate with wireless communication devices 104. A base station 102 may alternatively be referred to as an access point (including nano-, pico- and femto-cells), a Node B, an evolved Node B, a Home Node B, or some other similar terminology.

To improve system capacity, a base station coverage area 106 may be partitioned into plural smaller areas, e.g., three smaller areas 108a, 108b and 108c. Each smaller area 108a, 108b, 108c may be served by a respective base transceiver station (BTS). The term "sector" can refer to a base transceiver station (BTS) and/or its coverage area 106 depending on the context in which the term is used. For a sectorized cell, the base transceiver stations (BTS) for all sectors of that cell are typically co-located within the base station 102 for the cell.

Wireless communication devices 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

It is desirable that a wireless communication device 104 use a minimal amount of power to extend the battery life of the subscriber station. It is also desirable that any delays be minimized (to improve the user experience of the subscriber station). Thus, benefits may be realized by systems and methods that effectively minimize delays while maximizing the battery life for wireless communication devices 104. These benefits may be realized by both the wireless communication devices 104 and corresponding base stations 102.

Figure 2:
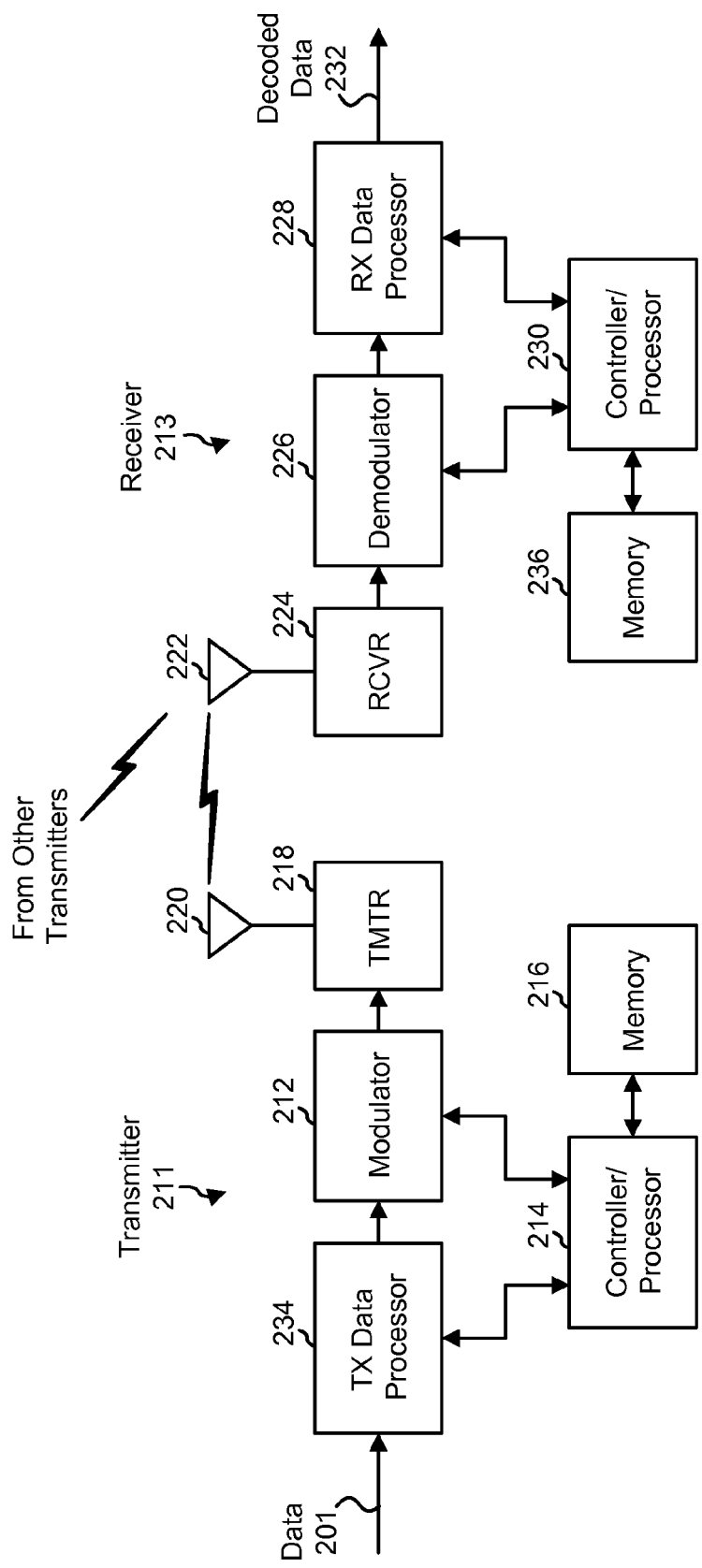
FIG. 2 illustrates a block diagram of a transmitter and a receiver in a wireless communication system according to some embodiments of the present invention.

FIG. 2 illustrates a block diagram of a transmitter 211 and a receiver 213 in a wireless communication system 100 according to some embodiments of the present invention. For the downlink, the transmitter 211 may be part of a base station 102 and the receiver 213 may be part of a wireless communication device 104. For the uplink, the transmitter 211 may be part of a wireless communication device 104 and the receiver 213 may be part of a base station 102.

At the transmitter 211, a transmit (TX) data processor 234 receives and processes (e.g., formats, encodes, and interleaves) data 201 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 218 conditions (e.g., filters, amplifies, and upconverts) the modulated signal and generates an RF modulated signal, which is transmitted via an antenna 220.

At the receiver 213, an antenna 222 receives RF modulated signals from the transmitter 211 and other transmitters. The antenna 222 provides a received RF signal to a receiver unit (RCVR) 224. The receiver unit 224 conditions (e.g., filters, amplifies, and downconverts) the received RF signal, digitizes the conditioned signal, and provides samples. A demodulator 226 processes the samples as described below and provides demodulated data. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 234, respectively, at the transmitter 211.

Controllers/processors 214 and 230 direct operation at the transmitter 211 and receiver 213, respectively. Memories 216 and 236 store program codes in the form of computer software and data used by the transmitter 211 and receiver 213, respectively.

Figure 3:
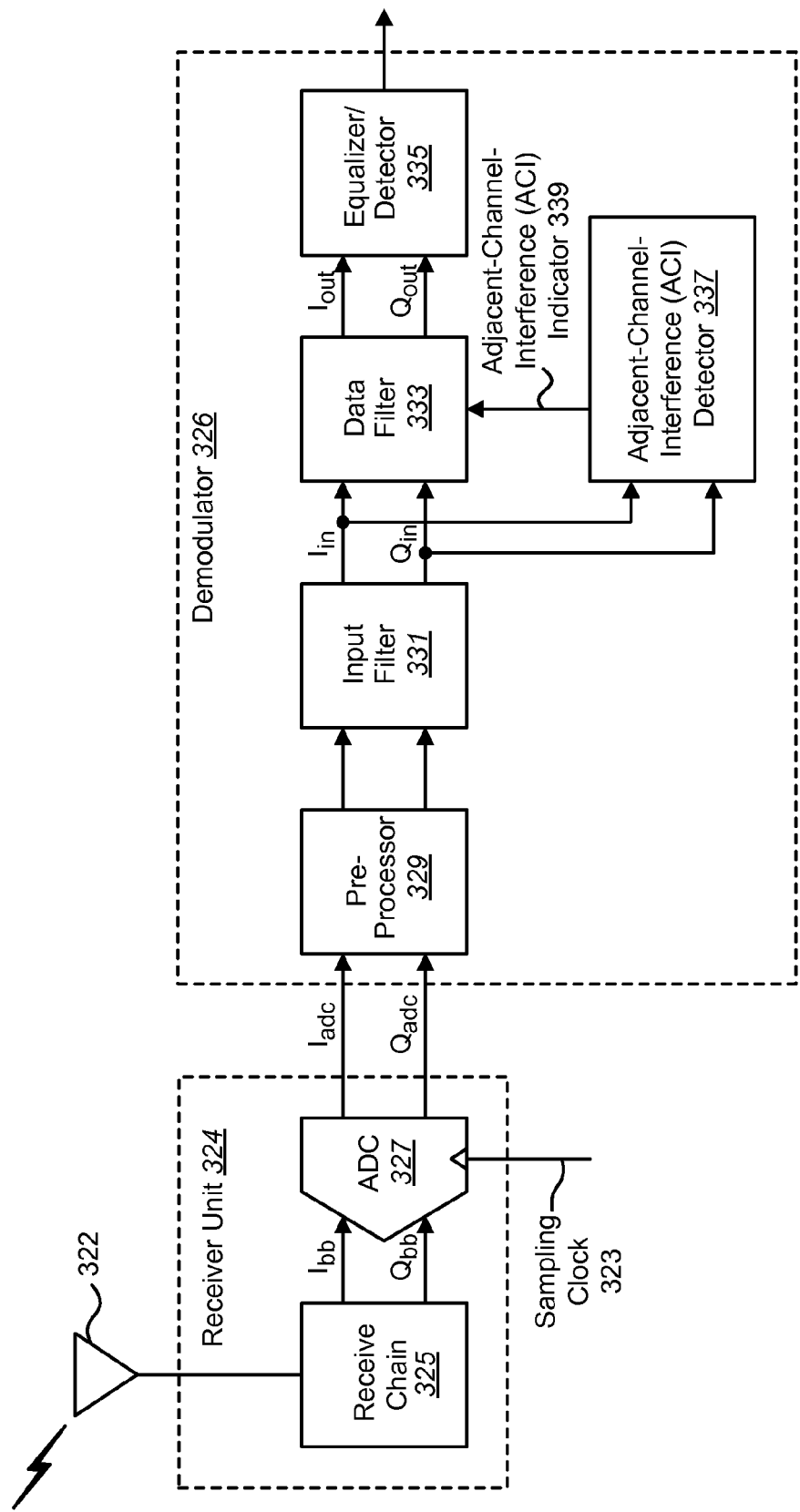
FIG. 3 illustrates a block diagram of a design of a receiver unit and demodulator at a receiver according to some embodiments of the present invention.

FIG. 3 illustrates a block diagram of a design of a receiver unit 324 and a demodulator 326 at a receiver 213 according to some embodiments of the present invention. Within the receiver unit 324, a receive chain 325 processes the received RF signal and provides I (inphase) and Q (quadrature) baseband signals, which are denoted as $I_{bb}$ and $Q_{bb}$. The receive chain 325 may perform low noise amplification, analog filtering, quadrature downconversion, etc., as desired or needed. An analog-to-digital converter (ADC) 327 digitalizes the I and Q baseband signals at a sampling rate of $f_{adc}$ from a sampling clock 323 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 329 performs pre-processing on the I and Q samples from the analog-to-digital converter (ADC) 327. For example, the pre-processor 329 may remove direct current (DC) offset, remove frequency offset, etc. An input filter 331 filters the samples from the pre-processor 329 based on a particular frequency response and provides input I and Q samples, which are denoted as $I_{in}$ and $Q_{in}$. The input filter 331 may filter the I and Q samples to suppress images resulting from the sampling by the analog-to-digital converter (ADC) 327 as well as jammers. The input filter 331 may also perform sample rate conversion, e.g., from 24× oversampling down to 2× oversampling. A data filter 333 filters the input I and Q samples from the input filter 331 based on another frequency response and provides output I and Q samples, which are denoted as $I_{out}$ and $Q_{out}$. The input filter 331 and the data filter 333 may be implemented with finite impulse response (FIR) filters, infinite impulse response (IIR) filters, or filters of other types. The frequency responses of the input filter 331 and the data filter 333 may be selected to achieve good performance. In one design, the frequency response of the input filter 331 is fixed and the frequency response of the data filter 333 is configurable.

An adjacent-channel-interference (ACI) detector 337 receives the input I and Q samples from the input filter 331, detects for adjacent-channel-interference (ACI) in the received RF signal and provides an adjacent-channel-interference (ACI) indicator 339 to the data filter 333. The adjacent-channel-interference (ACI) indicator 339 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 339, to achieve desirable performance.

An equalizer/detector 335 receives the output I and Q samples from the data filter 333 and performs equalization, matched filtering, detection, and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 935-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) titled "Technical Specification 3rd Generation Partnership Project; Technical Specification Group GSM/EDGE Radio Access Network; Multiplexing and multiple access on the radio path (Release 4)," published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
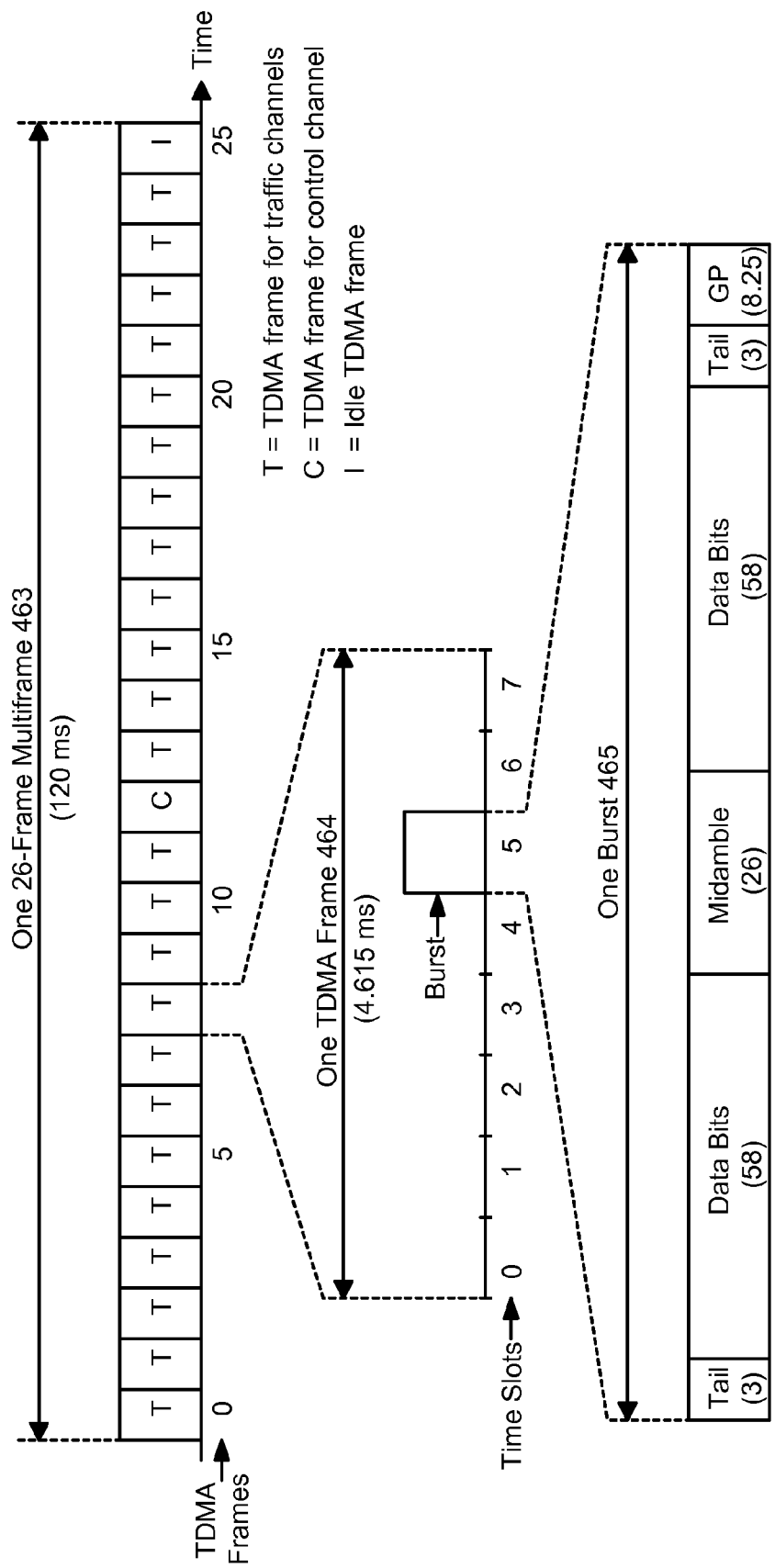
FIG. 4 illustrates example frame and burst formats in Global System for Mobile Communications (GSM) according to some embodiments of the present invention.

FIG. 4 illustrates example frame and burst formats in Global System for Mobile Communications (GSM) according to some embodiments of the present invention. The timeline for transmission is divided into multiframes 463 according to some embodiments of the present invention. For traffic channels used to transmit user-specific data, each multiframe 463 in this example includes 26 TDMA frames 464, which are labeled as TDMA frames 0 through 25. The traffic channels are sent in TDMA frames 0 through 11 and TDMA frames 13 through 24 of each multiframe 463. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 465 in GSM. Each burst 465 includes two tail fields, two data fields, a training sequence (or midamble) field, and a guard period (GP). The number of symbols in each field is shown inside the parentheses. A burst 465 includes symbols for the tail, data, and midamble fields. No symbols are sent in the guard period. TDMA frames of a particular carrier frequency are numbered and formed in groups of 26 or 51 TDMA frames 464 called multiframes 463.

Figure 5:
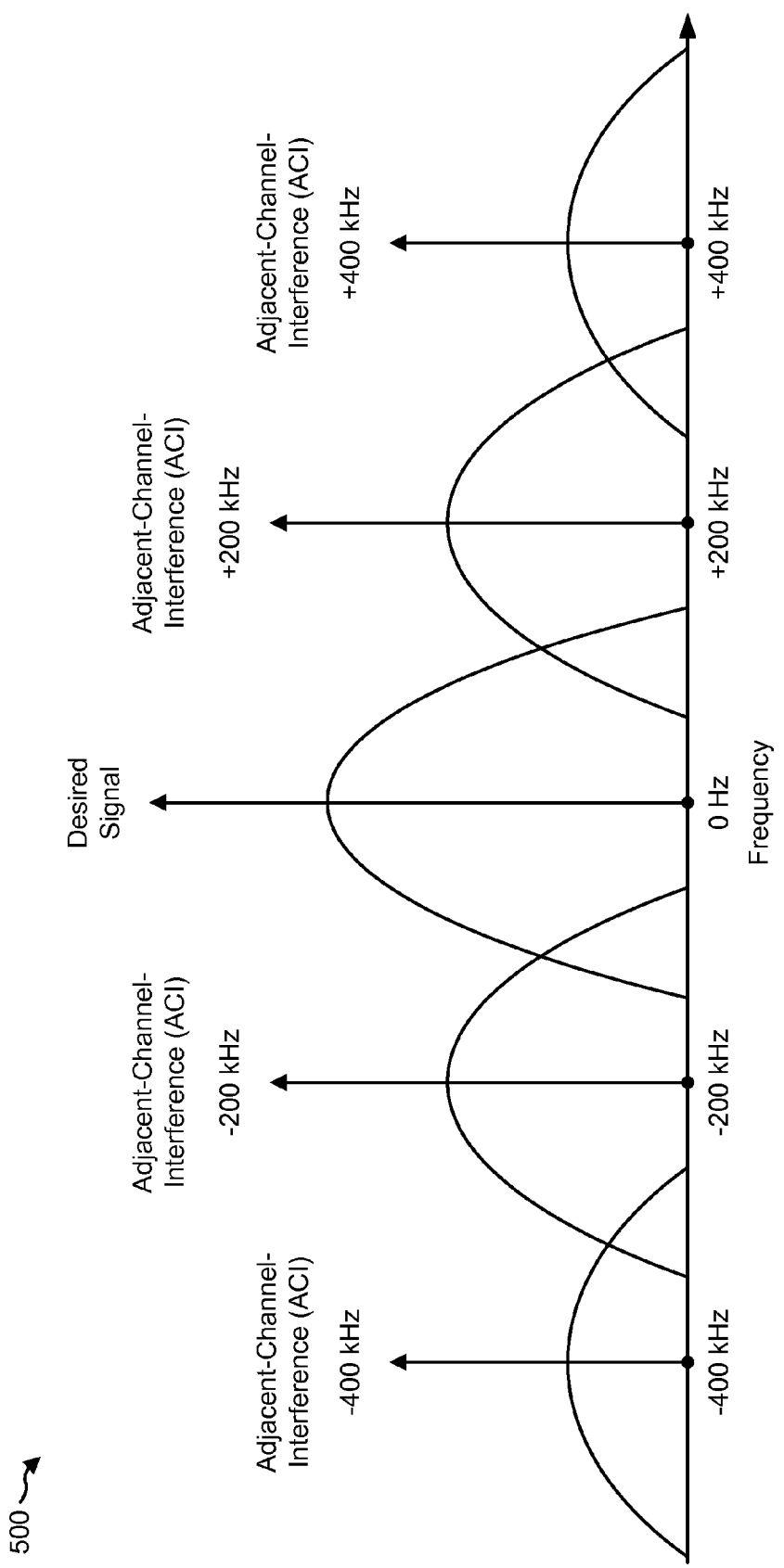
FIG. 5 illustrates an example spectrum in a GSM system according to some embodiments of the present invention.

FIG. 5 illustrates an example spectrum 500 in a GSM system according to some embodiments of the present invention. In this example, five RF modulated signals are transmitted on five RF channels that are spaced apart by 200 kHz. The RF channel of interest is shown with a center frequency of 0 Hz. The two adjacent RF channels have center adjacent-channel-interference (ACI) frequencies that are +200 kHz and −200 kHz from the center frequency of the desired RF channel. The next two nearest RF channels (which are referred to as blockers or non-adjacent RF channels) have center adjacent-channel-interference (ACI) frequencies that are +400 kHz and −400 kHz from the center frequency of the desired RF channel. There may be other RF channels in the spectrum 500, which are not shown in FIG. 5 for simplicity. In GSM, an RF modulated signal is generated with a symbol rate of $f_{sym}=13000/40=270.8$ symbols/second (ksps) and has a −3 decibel (dB) bandwidth of up to 135 kHz. The RF modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base station 102 local oscillator (LO), using frequency offset estimation and correction. These bursts include a single tone, which corresponds to all "0" payload and training sequences. The all "0" payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 may periodically wake up to monitor the frequency burst to maintain its synchronization in standby mode. In the standby mode, the frequency offset is within ±2 kHz.

One or more modulation schemes are used in GERAN systems to communicate information such as voice, data, and/or control information. Examples of the modulation schemes may include Gaussian Minimum Shift Keying (GMSK), M-ary Quadrature Amplitude Modulation (QAM) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The EGPRS2 standard uses GMSK, QPSK, 8-PSK, 16-QAM, and 32-QAM modulations. The modulation type can be changed from burst to burst. Q-PSK, 8-PSK, 16-QAM, and 32-QAM modulations in EGPRS2 are linear, 4-level, 8-level, 16-level, and 32-level phase modulations with $3\pi/4$, $3\pi/8$, $\pi/4$, $-\pi/4$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The symbol pulse of Q-PSK, 16-QAM, and 32-QAM can use spectrally narrow or wide pulse shapes.

Figure 6:
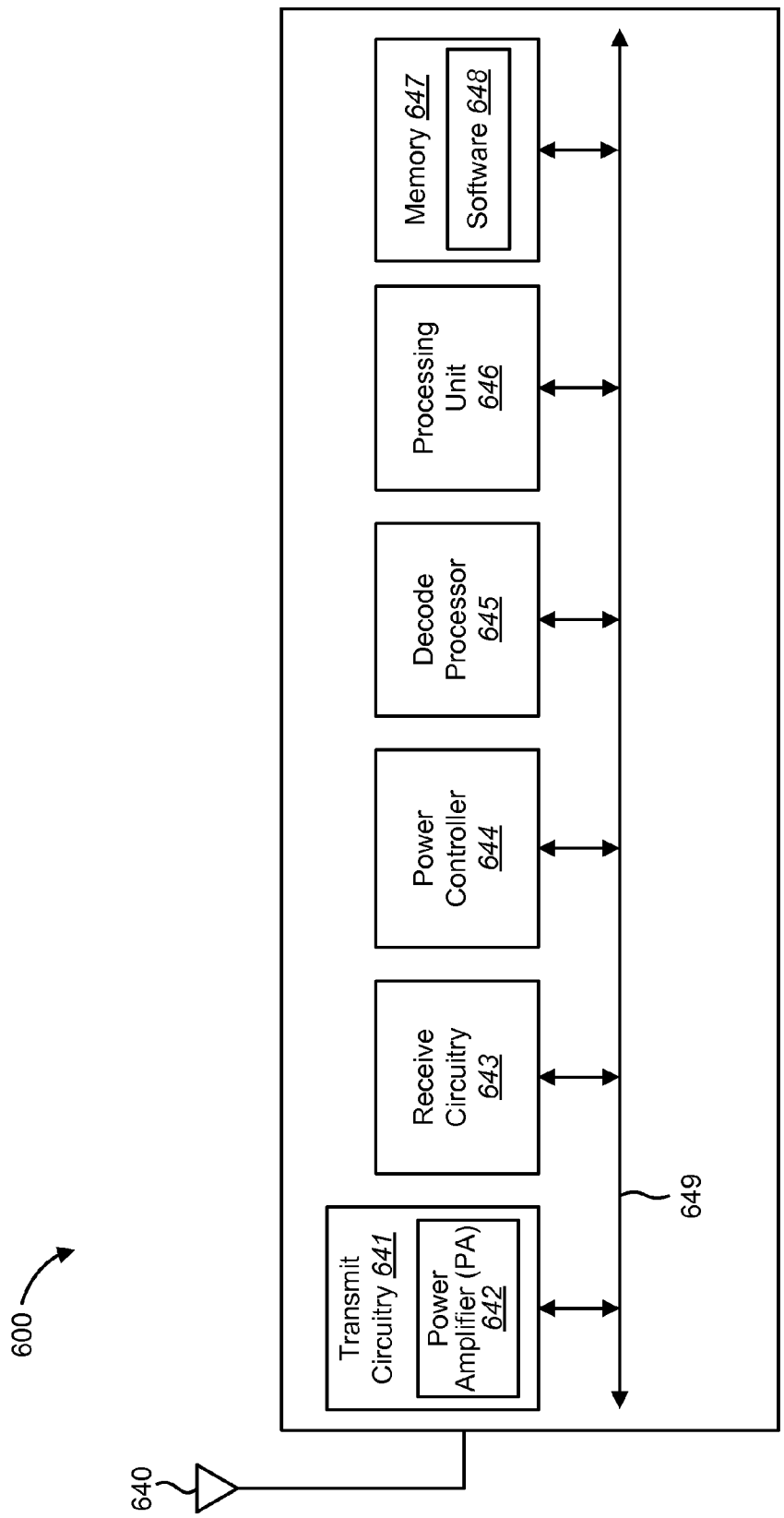
FIG. 6 illustrates an example of a wireless device according to some embodiments of the present invention that includes transmit circuitry (including a power amplifier), receive circuitry, a power controller, a decode processor, a processing unit for use in processing signals, and memory.

FIG. 6 illustrates an example of a wireless device 600 according to some embodiments of the present invention that includes transmit circuitry 641 (including a power amplifier (PA) 642), receive circuitry 643, a power controller 644, a decode processor 645, a processing unit 646 for use in processing signals, and memory 647. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649, which may include a power bus, a control signal bus, and a status signal bus in addition to a data bus. For the sake of clarity, the various busses are illustrated in FIG. 6 as the bus system 649.

The steps of the methods discussed may also be stored as instructions in the form of software or firmware located in memory 647 in a wireless device 600. These instructions may be executed by the controller/processor(s) of the wireless device 600. Alternatively, or in conjunction, the steps of the methods discussed may be stored as instructions in the form of software or firmware 648 located in memory 647 in the wireless device 600. These instructions may be executed by the processing unit 646 of the wireless device 600 in FIG. 6.

Figure 7:
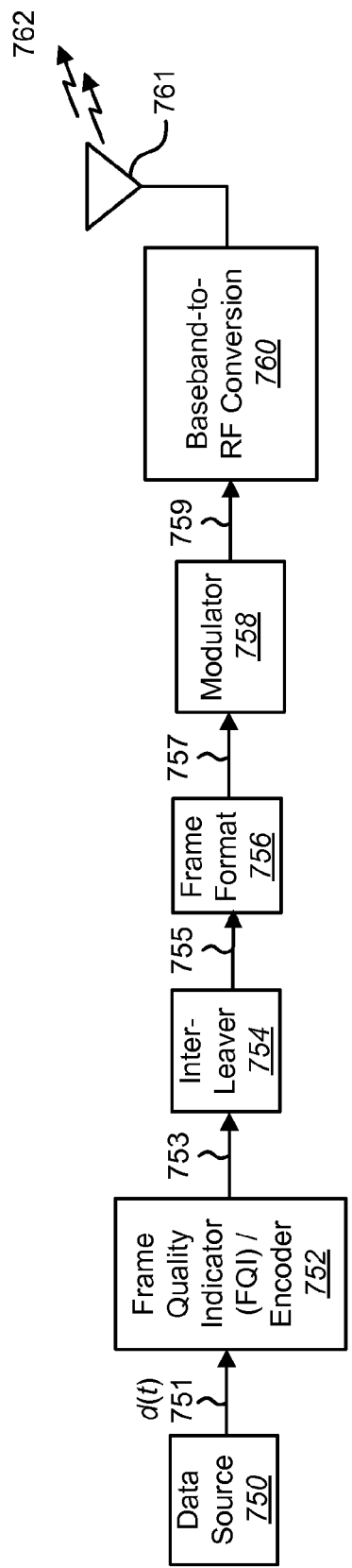
FIG. 7 illustrates an example of a transmitter structure and/or process according to some embodiments of the present invention.

FIG. 7 illustrates an example of a transmitter structure and/or process according to some embodiments of the present invention. The transmitter structure and/or process of FIG. 7 may be implemented in a wireless device such as a wireless communication device 104 or a base station 102. The functions and components shown in FIG. 7 may be implemented by software, hardware, or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code, or any other dimension. A frame 757 may be composed of a fixed plurality of such sub-segments, each sub-segment including a portion of the total number of symbols allocated to the frame 757. In one example, the interleaved symbols 755 are segmented into a plurality S of sub-segments making up a frame 757.

A frame format block 756 may further specify the inclusion of, e.g., control symbols (not shown), along with the interleaved symbols 755. Such control symbols may include, e.g., power control symbols, frame format information symbols, etc.

A modulator 758 modulates the frame 757 to generate modulated data 759. Examples of modulation techniques include binary phase shift keying (BPSK) and quadrature phase shift keying (QPSK). The modulator 758 may also repeat a sequence of modulated data.

A baseband-to-radio-frequency (RF) conversion block 760 may convert the modulated data 759 to RF signals for transmission via an antenna 761 as signal 762 over a wireless communication link to one or more wireless device receivers.

Figure 8:
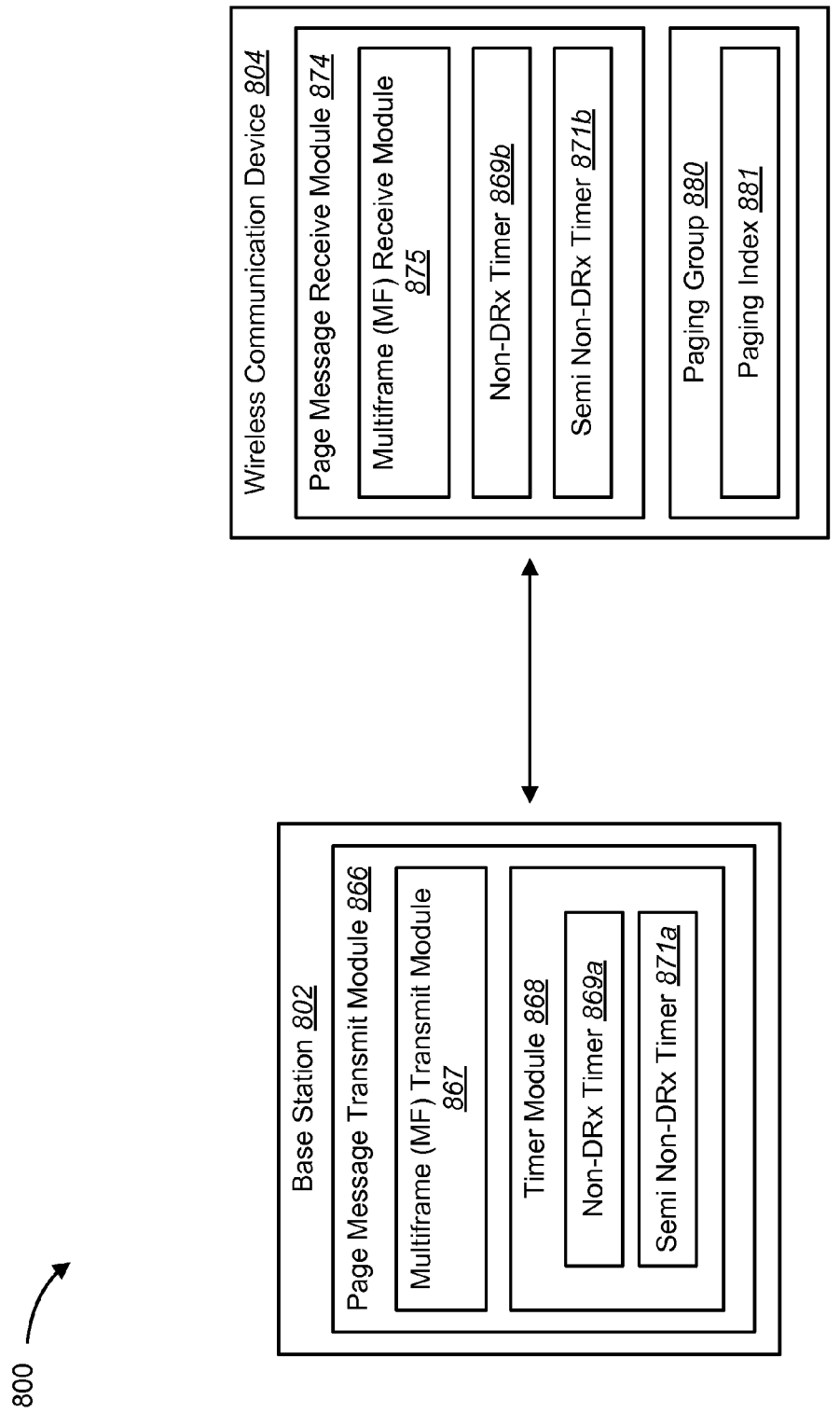
FIG. 8 is a block diagram illustrating an example of a wireless communication system in which the systems and methods disclosed herein may be utilized.

FIG. 8 is a block diagram illustrating an example of a wireless communication system 800 in which the systems and methods disclosed herein may be utilized. The wireless communication system 800 may be one configuration of the wireless communication system 100 described in connection with FIG. 1. For example, the base station 802 and the wireless communication device 804 of FIG. 8 may correspond to the base station 102 and wireless communication device 104 of FIG. 1.

The base station 802 may include a page message transmit module 866. The page message transmit module 866 may transmit messages to a wireless communication device 804 based on the mode of operation of the wireless communication device 804. For example, if the wireless communication device 804 is in semi non-discontinuous receive (non-DRx) mode, the page message transmit module 866 may transmit page messages to the wireless communication device 804 more frequently than if the wireless communication device 804 is in non-discontinuous receive (non-DRx) mode and less frequently than if the wireless communication device 804 is in discontinuous receive (DRx) mode.

In DRx mode, a wireless communication device 804 may conserve battery by limiting the amount of time the wireless communication device 804 spends monitoring incoming transmissions, such as pages. However, in DRx mode, the wireless communication device 804 may have to wait longer periods of time between reading incoming pages because the incoming pages are not sent frequently enough.

In non-DRx mode, the wireless communication device 804 continuously monitors for incoming transmissions, such as pages. However, in DRx mode, the wireless communication device 804 may consume too much power by attempting to read messages on page blocks where no page messages have been sent by the base station 802.

The page message transmit module 866 may include a multiframe (MF) transmit module 867 and a timer module 868. The multiframe (MF) transmit module 867 may transmit multiframe (MF) radio blocks to a wireless communication device 804. For example, a multiframe (MF) radio block may be a 51-multiframe (MF) radio block. The timer module 868 may include a non-DRx timer 869a, and a semi non-DRx timer 871a.

The wireless communication device 804 may include a page message receive module 874 and a paging group 880. The page message receive module 874 may include a multiframe (MF) receive module 875, a non-DRx timer 869b and a semi non-DRx timer 871b. The paging group 880 may include a paging index 881.

One or more wireless communication devices 804 may belong to a paging group 880. The paging group 880 may indicate when to read multiframe (MF) radio blocks. For example, the paging group 880 may indicate to the wireless communication device 804 when to read a multiframe (MF) radio block, such as once every third 51-multiframe (MF) cycle. The paging group 880 may be determined by an international mobile subscriber identity of the wireless communication device 804.

The paging index 881 may indicate which paging block slot to read in the multiframe (MF) radio block. The wireless communication device 804 may receive messages from the base station 802 on any of the 51-multiframes (MF) corresponding to the wireless communication device's 804 own paging index 881. Additional description regarding paging groups 880 and the paging index 881 will be given below. The non-DRx timer 869b and the semi non-DRx timer 871b will also be described below.

The multiframe (MF) receive module 875 on the wireless communication device 804 may receive multiframe (MF) radio blocks from a base station 802. For example, a multiframe (MF) radio block may be a 51-multiframe (MF) radio block.

The wireless communication device 804 may operate in various modes of operation, such as idle mode, dedicated mode and packet transfer mode. As the wireless communication device 804 switches between modes of operation, the base station 802 may receive and maintain this information. For example, the base station 802 may store the mode of operation of a wireless communication device 804 in the page message transmit module 866. Knowing the current mode of operation of the wireless communication device 804 allows the wireless communication system 800 and the base station 802 to decide how to send communications to the wireless communication device 804. For example, the base station 802 may use the mode of operation of the wireless communication device 804 to determine when to send an assignment message to the wireless communication device 804 using the wireless communication device's 804 paging group 880.

GERAN specifications define two modes of operation for a wireless communication device 804 in idle mode: discontinuous receive (DRx) mode and non-discontinuous receive (non-DRx) mode. DRx mode allows a wireless communication device 804 to conserve battery by limiting the amount of time the wireless communication device 804 spends monitoring incoming transmissions. Non-DRx mode disables DRx mode on the wireless communication device 804. DRx and non-DRx modes will be further described below.

According to some embodiments of the present invention, an additional mode called semi non-DRx mode may be employed. In semi non-DRx mode, the wireless communication device 804 may monitor for transmissions more frequently than if the wireless communication device 804 is in DRx mode and less frequently than if the wireless communication device 804 is in non-DRx mode. For example, in semi non-DRx mode, a wireless communication device 804 may monitor a paging block once for each multiframe (MF) cycle. The multiframe (MF) cycle may be a 51-multiframe (MF) cycle.

In DRx mode, the wireless communication device 804 may monitor only the radio blocks on the common control channel (CCCH) that correspond to its own paging group 880. The paging group 880 may be calculated by the wireless communication device 804 and the wireless communication network (i.e., wireless communication system) 800 using the formula defined in 3GPP TS 45.002. Thus, the wireless communication device 804 may read only one radio block corresponding to the paging index 881 of the wireless communication device 804 every nth 51-multiframe. The parameter n may be 2, 3, 4, 5, 6, 7, 8, or 9, depending on the specific network configuration. The paging index 881 may be calculated by a wireless communication device 804 and by the wireless communication network 800 using the formula defined in 3GPP TS 45.002. In DRx mode, the wireless communication device 804 may conserve battery power. However, this power conservation may be at the expense of excess delay when trying to start a downlink data transfer.

In DRx mode, wireless communication devices 804 can have varying monitoring features. For example, in the shortest DRx cycle mode, the wireless communication device 804 may monitor the paging block every $2^{nd}$ 51-multiframe (MF). In the longest DRx cycle mode, however, the wireless communication device 804 may monitor the paging block every ninth 51-multiframe. The frequency of the wireless communication device 804 monitoring the paging block may be controlled by broadcast information from the base station 802 and/or the wireless communication system. It should be noted that the examples above of DRx mode assume that a split paging cycle is not employed.

Prior to entering DRx mode, a wireless communication device 804 may first enter non-DRx mode. In non-DRx mode, the wireless communication device 804 may monitor all blocks on the common control channel (CCCH) for the wireless communication device 804. In non-DRx mode, the wireless communication device 804 may receive a new assignment message for a downlink data transfer with a minimal delay.

Non-DRx mode can be split into four different groups, depending on what type of information the wireless communication device 804 is using the GPRS connection for. The four groups are transfer non-DRx mode, mobility management (MM) non-DRx mode, network control (NC) non-DRx mode, and multimedia broadcast/multicast service (MBMS) non-DRx mode (see 3GPP TS 44.060). The present systems and methods may be most useful when a wireless communication device 804 enters transfer non-DRx mode, although semi non-DRx mode may be employed with all non-DRx modes.

In transfer non-DRx mode, the wireless communication device 804 may transfer user data before entering idle mode (e.g., DRx mode). Transfer non-DRx mode is generally the most common non-DRx mode. In mobility management (MM) non-DRx mode, the wireless communication device 104 may transfer mobility management messages before entering idle mode. Mobility management (MM) non-DRx mode generally happens when the wireless communication device 804 is performing registration, a routing area update, or a location area update. In MBMS non-DRx mode, the wireless communication device 804 may transfer MBMS data. MBMS may not be implemented by the wireless communication device 804. In network control (NC) non-DRx mode, the wireless communication device 804 may send network controlled measurement reports before entering idle mode. Network control (NC) non-DRx mode is supported but not typically used.

The duration of transfer non-DRx mode may be the duration or value of the non-DRx timer 869. The value (e.g., time) of the non-DRx timer 869*b* may be the minimum value of a NON-DRX-TIMER-MAX parameter and a NON-DRX-TIMER parameter. The NON-DRX-TIMER-MAX parameter may be broadcast in GPRS Cell Options. For example, the NON-DRX-TIMER-MAX parameter may be determined by the timer module 868 on the base station 802 and broadcast to the wireless communication device 804. The NON-DRX-TIMER parameter may be determined by the manufacturer of the wireless communication device 804 and signaled by the wireless communication device 804 to the network via GPRS Mobility Management (GMM) procedures. The duration of transfer non-DRx mode is such that it is a compromise between power consumption in the wireless communication device and delay in establishing a connection by the wireless communication network with the wireless communication device 804.

The delay is the excess time the wireless communication network 800 spends trying to reconnect with and establish a connection, such as downlink temporary block flow (TBF), with the wireless communication device 804. For example, if the non-DRx timer 869*b* (e.g., NON-DRX-TIMER) is set to 0, it may take up to 480 msec for the network to send an assignment for downlink temporary block flow (TBF) for even the shortest paging cycle to the wireless communication device 804. This can lead to poor performance, especially for bursty applications. If the wireless communication device 804 is set to a non-zero value for the non-DRx timer 869*b*, the wireless communication device 804 may waste power monitoring unnecessary downlink radio blocks.

According to some embodiments of the present invention, both power consumption and delay may be reduced by the wireless communication device 804 employing semi non-DRx mode. Semi non-DRx mode combines the best features of both DRx mode and transfer non-DRx mode. Semi non-DRx mode may also be referred to as semi transfer non-DRx mode, as it is a new transfer non-DRx mode. It should be appreciated that while semi non-DRx mode is being applied to transfer non-DRx mode, it may be equally applied to mobility management (MM) non-DRx mode, network control (NC) non-DRx mode, and/or MBMS non-DRx mode.

While in semi non-DRx mode, a wireless communication device 804 may monitor the radio block corresponding to the paging index for the wireless communication device 804 for the same paging index 881 on every 51-multiframe (MF) for a duration of time. The wireless communication device 804 may remain in semi non-DRx mode for either the duration of the non-DRx timer 869b (e.g., NON-DRX-TIMER) or for the duration of a semi non-DRx timer 871b. The semi non-DRx timer 871b may be referred to as SEMI-NON-DRX-TIMER.

One benefit of semi non-DRx mode is that the connection, such as downlink temporary block flow (TBF), may be established with a maximum delay of 235 msec (i.e. one 51-multiframe). While power consumption of the wireless communication device 804 may increase slightly, the increase may be still significantly lower than the current power consumption of the wireless communication device 804 in transfer non-DRx mode. Estimates of the power consumptions for legacy mode (i.e., non-DRx mode) and the new semi non-DRx mode (i.e., semi transfer non-DRx) are given in Table 1 below.

TABLE 1

| | | Mode | | | |
|---|---|---|---|---|---|
| | | Transfer non-DRx | | Semi Transfer | Semi Transfer non-DRx |
| Paging Cycle | DRX | Non-combined CCCH | Combined CCCH | non-DRx (Read 1 BCCH Block) | (Read 0 BCCH Block) |
| 2 | $X_2$ | $20 * X_2$ | $6 * X_2$ | $4 * X_2$ | $2 * X_2$ |
| 3 | $X_3$ | $30 * X_3$ | $9 * X_3$ | $6 * X_3$ | $3 * X_3$ |
| 4 | $X_4$ | $40 * X_4$ | $12 * X_4$ | $8 * X_4$ | $4 * X_4$ |
| 5 | $X_5$ | $50 * X_5$ | $15 * X_5$ | $10 * X_5$ | $5 * X_5$ |
| 6 | $X_6$ | $60 * X_6$ | $18 * X_6$ | $12 * X_6$ | $6 * X_6$ |
| 7 | $X_7$ | $70 * X_7$ | $21 * X_7$ | $14 * X_7$ | $7 * X_7$ |
| 8 | $X_8$ | $80 * X_8$ | $24 * X_8$ | $16 * X_8$ | $8 * X_8$ |
| 9 | $X_9$ | $90 * X_9$ | $27 * X_9$ | $18 * X_9$ | $9 * X_9$ |

In Table 1, $X_i$ represents power consumption with paging cycle i. The parameter i may be 2, 3, 4, 5, 6, 7, 8, or 9, depending on the specific network configuration. In addition, transfer non-DRx mode in Table 1 assume one broadcast control channel (BCCH) block read on every 51-multiframe (MF).

In DRx mode, the power consumption Xi is dependent on the paging cycle. For example, the wireless communication device 804 that reads a radio block every two 51-multiframes (MFs) (i.e. $X_2$) consumes more power than if it reads a radio block every four 51-multiframes (MFs) (i.e. $X_4$). Thus, power consumption in DRx mode may be as follows: $X_2 > X_3 > X_4 > X_5 > X_6 > X_7 > X_8 > X_9$.

Figure 10:
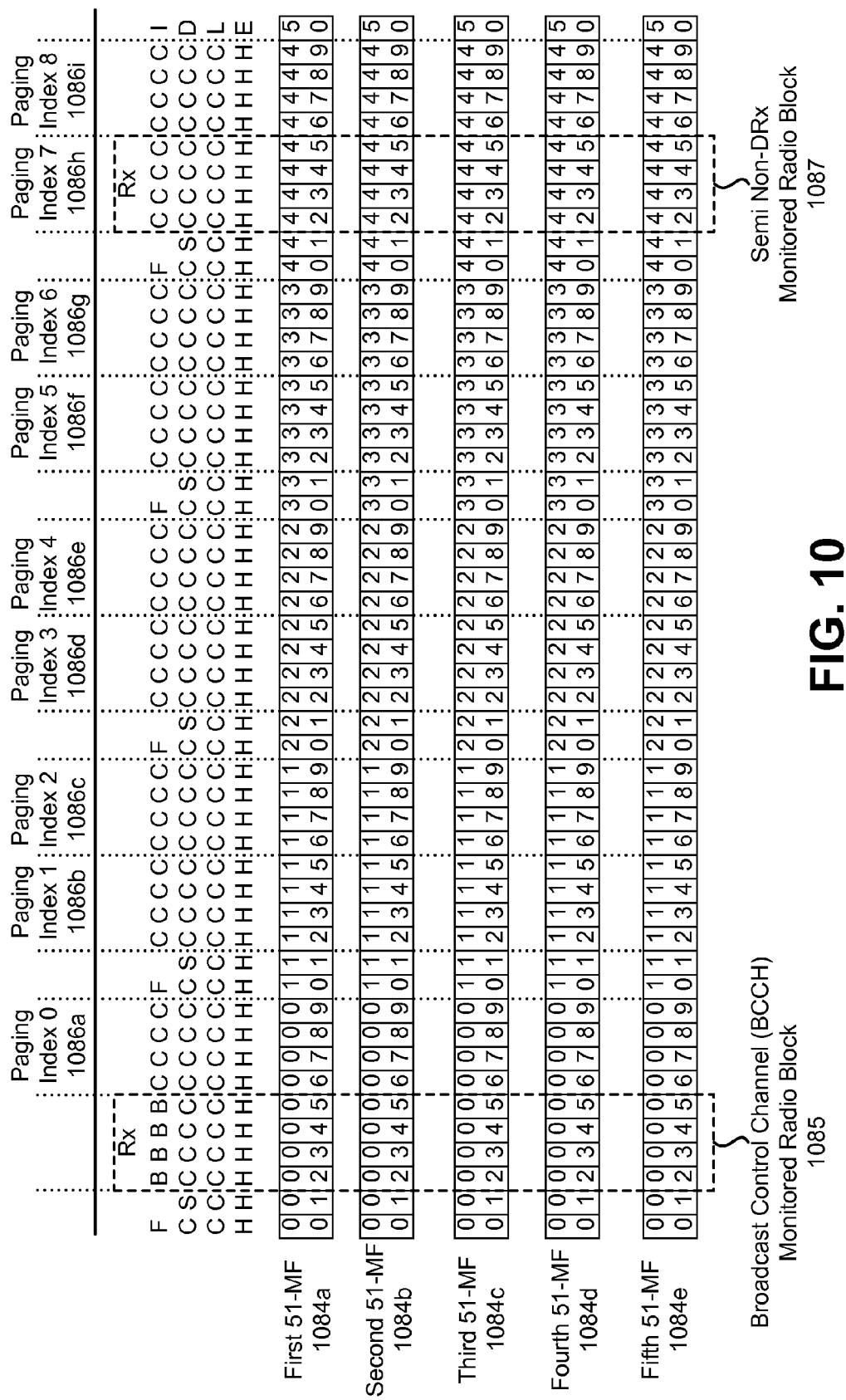
FIG. 10 is a block diagram illustrating the radio blocks read by a wireless communication device during semi non-DRx mode according to some embodiments of the present invention.

In both non-DRx mode and semi non-DRx mode, the power consumption is independent of the paging cycle i. For non-DRx mode, the power consumption estimates shown in Table 1 exclude the frequency correction channel (FCCH), synchronization channel (SCH), and IDLE frames from the 51-multiframes (MF). It may also be appreciated that to receive one radio block, the wireless communication device 804 is required to receive exactly four frames. FIG. 10, described below, provides an illustration of multiframe (MF) radio blocks.

For wireless communication devices 804 to employ semi non-DRx mode, specification changes may be required. Specifically, the specification change may include adding an indication in the GPRS Cell Options to signal to the wireless communication device 804 that the base station 802 supports semi non-DRx mode. Table 2 below provides an example of a GPRS Cell Options information element extension is for the case where the existing NON-DRX-MAX timer information is used for semi transfer non-DRx mode by the wireless communication system (e.g., the wireless communication network 800).

TABLE 2

```
{                    -- Rel-11 extension:
                     < SEMI_NON_DRX_MODE : bit > }
                     < spare bit > ** } // ;
SEMI_NON_DRX_MODE (1 bit field)
This field indicates whether the cell supports semi non-DRx mode.
0        The cell does not support semi non-DRx mode.
1        The cell supports semi non-DRx mode.
```

When the SEMI_NON_DRX_MODE indicates that the NON-DRX-MAX timer is to be employed, the values of the semi non-DRx timer 871b may be the same as the values defined for the non-DRx timer 869b. In other configurations, the semi non-DRx timer 871b may have newly defined values. Table 3 below provides an example of a GPRS Cell Options information element where a new NON-DRX-MAX timer is used (i.e., the semi non-DRx timer 871b).

TABLE 3

```
{                    -- Rel-11 extension:
                     < 0 | 1 SEMI_NON_DRX_TIMER_MAX : bit(3) > }
                     < spare bit > ** } // ;
SEMI_NON_DRX_TIMER_MAX (3 bit field)
The presence of this field indicates that cell supports semi non-DRx mode.
0 0 0    1 sec
0 0 1    2 sec
0 1 0    4 sec
0 1 1    8 sec
1 0 0    16 sec
1 0 1    32 sec
1 1 0    64 sec
1 1 1    128 sec
```

The specification modification may also include an indication in the wireless communication device 104 Radio Access Capability (RAC) to signal that the wireless communication device 104 supports semi non-DRx mode. An example of a wireless communication device 104 Radio Access Capability (RAC) information element is given below in Table 4 (where MS refers to mobile station (i.e., the wireless communication device 104)).

An alternative approach to using GPRS Cell options to signal network capability for semi transfer non-DRx mode is for the wireless communication network 800 to instruct the wireless communication device 804 within Radio Link Control/Medium Access Control (RLC/MAC) messages. The Radio Link Control/Medium Access Control (RLC/MAC) messages may indicate to a wireless communication device 804 to use semi transfer non-DRx mode.

The advantage of using a Radio Link Control/Medium Access Control (RLC/MAC) message is that the wireless communication network 800 may decide on a per-application basis if semi transfer non-DRx mode is more appropriate or the legacy transfer non-DRx mode is more appropriate. For example, for a service such as instant messenger, then response time from the user on the wireless communication device 804 may be quite slow. Here, semi transfer non-DRx mode may be more appropriate. If a service where the response time required is much quicker than one multiframe is used, such as web browsing), then legacy transfer non-DRx mode may be more appropriate.

The example coding shown in Table 2 or Table 3 may be added as a an extension to appropriate downlink Radio Link Control/Medium Access Control (RLC/MAC) messages, such as Packet Uplink Acknowledgement/Negative Acknowledgement (ACK/NACK), Packet Uplink Assignment message, Packet Downlink Assignment message, Packet Timeslot Reconfigure message, etc. The wireless communication device 804 may signal its support for semi transfer non-DRx mode in Mobile Station (MS) Radio Access Capability as shown in Table 4, below.

TABLE 4

-- Additions for release 11:
< SEMI_NON_DRX_MODE : bit >;
SEMI_NON_DRX_MODE (1 bit field)
This field indicates whether MS supports semi non-DRx mode
0   MS does not support semi non-DRx mode.
1   MS supports semi non-DRx mode The existing non-DRx timer parameter may be used to signal the duration of the semi non-DRx mode. For example, the existing non-DRx timer parameter may determine both the value of the non-DRx timer 869b and the value of the semi non-DRx timer 871b. However, cells that do not support semi non-DRx mode may force wireless communication devices 804 to use the legacy non-DRx mode. This may not be desirable, as this could increase the idle mode power consumption significantly, as shown above in Table 1. It may be more desirable to introduce a new timer value for the semi non-DRx mode, such as a semi non-DRx timer 871, on the base station 802. A new timer value (e.g., the value of the semi non-DRx timer 871) may require a new information element carried by an ATTACH REQUEST message and a ROUTING AREA UPDATE REQUEST message. The new information element to be added to GPRS Mobility Management (GMM) messages is illustrated below in Table 5.

TABLE 5

| IEI | Information Element | Type/Reference | Presence | Format | Length |
|---|---|---|---|---|---|
| xx | DRX parameter2 | DRX parameter2 10.5.5.6 | O | TV | 2 |

Table 6 below provides the definition of a non-DRx timer for use in the present systems and methods. The specific values for the semi non-DRx timer 871b may be the same as those defined for a non-DRx timer in 3GPP TS 24.008 or those proposed above in Table 3.

TABLE 6

| 8 | 7 | 6 | 5 | 4 | 3 | 2 | 1 | |
|---|---|---|---|---|---|---|---|---|
| | | | DRX parameter IEI | | | | | octet 1 |
| | | Spare | | | Semi non-DRx timer | | | octet 2 |

Figure 9:
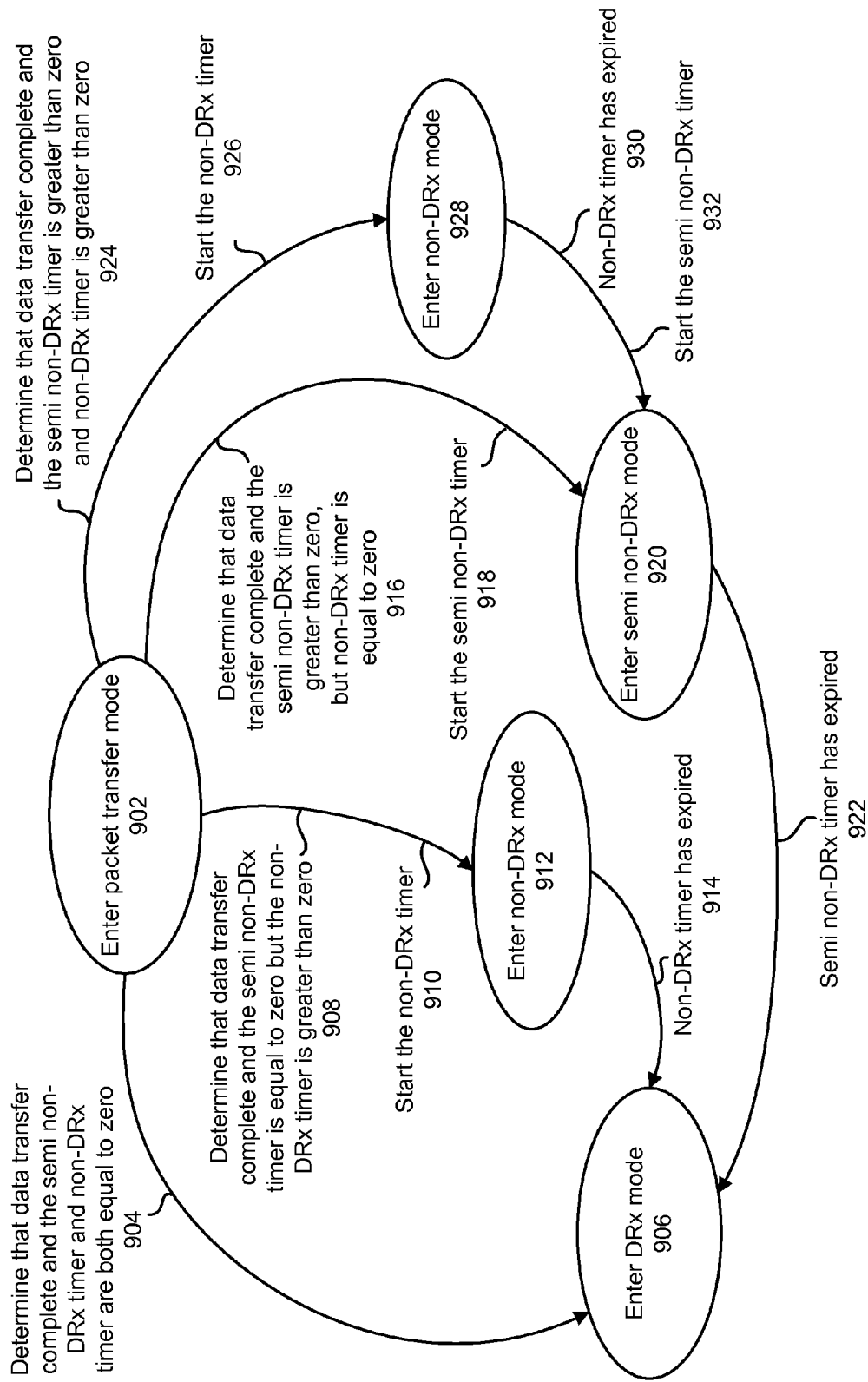
FIG. 9 is a flow diagram illustrating mode transitions for a wireless device according to some embodiments of the present invention.

FIG. 9 is a flow diagram illustrating mode transitions for a wireless device according to some embodiments of the present invention. The mode transitions may be performed by a wireless device such as a wireless communication device 104. A base station 102 may track the different mode transitions of the wireless communication device 104. The wireless communication device 104 may initially enter 902 packet transfer mode. Once packet transfer mode is finished (i.e., the data transfer is complete), the wireless communication device 104 may switch to packet idle mode, such as non-DRx mode, semi non-DRx mode, or DRx mode.

The wireless communication device 104 may determine whether a semi non-DRx timer 871b on the wireless communication device 104 has a value greater than zero. As discussed above, the semi non-DRx timer 871b may be a timer used by the wireless communication device 104 to determine how long (or if at all) the wireless communication device 104 will remain in a semi non-DRx mode (i.e. semi non-DRx packet idle mode) after packet transfer mode and before entering a DRx mode (i.e., DRx packet idle mode). Values for the semi non-DRx timer 871b may be 0, 1, 2, 4, 8, 16, 32, or 64 seconds, for example. Other values for the semi non-DRx timer 871b may also be used. The wireless communication device 104 may also determine whether the non-DRx timer 869b is greater than zero.

If the network does not support semi non-DRx mode, then a wireless communication device 104 may not use semi non-DRx mode. If the network does support semi non-DRx mode with NON-DRX-MAX, then the wireless communication device 104 may select the minimum of the semi non-DRx timer 869b supported by the wireless communication device 104 and the NON-DRX-MAX timer supported by the network. If the network does support semi non-DRx mode with the new SEMI-NON-DRX-MAX, then the wireless communication device 104 may select the minimum of the semi non-DRx timer 871b supported by the wireless communication device 104 and the semi non-DRx timer 871a (e.g., SEMI-NON-DRX-MAX timer) supported by the network. Thus, if the wireless communication device 104 has a semi non-DRx timer 871b with a value greater than zero, then the network supports semi-DRx mode with either a NON-DRX-MAX timer or a SEMI-NON-DRX-MAX timer.

If the wireless communication device 104 determines 904 that the wireless communication device 104 does not have a semi non-DRx timer 871b with a value greater than zero (e.g., the value of the semi non-DRx timer 871b is zero) and the wireless communication device 104 does not have a non-DRx timer 869b with a value greater than zero (e.g., the value of the non-DRx timer 869b is zero) when the data transfer is complete, the wireless communication device 104 may directly enter 906 into DRx mode.

If the wireless communication device 104 determines 908 that the wireless communication device 104 has a semi non-DRx timer 871b equal to zero, but a non-DRx timer 869b greater than zero when the data transfer is complete, the wireless communication device 104 start 910 the semi non-DRx timer 871b and may enter 912 non-DRx mode for the duration of the non-DRx timer 869. The wireless communication device 104 may then switch to and enter 906 DRx mode once the non-DRx timer 869b has expired 914.

If the wireless communication device 104 determines 916 that the wireless communication device 104 has a semi non-DRx timer with a value greater than zero when the data transfer is complete, the wireless communication device 104 may start 918 the semi non-DRx timer and may enter 920 semi non-DRx mode. As described above, the semi non-DRx mode may represent a new state or mode of DRx/non-DRx modes. Once the semi non-DRx timer 871b has expired 922, the wireless communication device 104 may switch from semi-non DRx mode and enter 906 DRx mode.

As shown in FIG. 9, in some configurations, semi non-DRx mode may replace non-DRx mode on the wireless communication device 104. In other words, the wireless communication device 104 may include functionality for either semi non-DRx mode or non-DRx mode.

In another configuration (not shown), the wireless communication device 104 may include functionality for both semi non-DRx mode and non-DRx mode. For example, if the wireless communication device 104 has a semi non-DRx timer 871b with a value greater than zero and a non-DRx timer 869b with a value greater than zero when the data transfer is complete, the wireless communication device 104 may start the semi non-DRx timer 871b and may switch to semi non-DRx mode. Once the semi non-DRx timer 871b has expired, the wireless communication device 104 may switch from semi non-DRx mode to non-DRx mode. The wireless communication device 104 may enter non-DRx mode for the duration of the non-DRx timer 869. The wireless communication device 104 may then switch from non-DRx mode to DRx mode once the non-DRx timer 869b has expired.

In yet another configuration, if the wireless communication device 104 determines 924 that the wireless communication device 104 has a semi non-DRx timer 871b with a value greater than zero and a non-DRx timer 869b with a value greater than zero when the data transfer is complete, the wireless communication device 104 may start 926 the non-DRx timer 869b and may enter 928 non-DRx mode. Once the non-DRx timer 869b has expired 930, the wireless communication device 104 may switch from non-DRx mode and enter 920 semi non-DRx mode. In other words, the wireless communication device 104 may start 932 the semi non-DRx timer 871b and may enter 920 semi non-DRx mode. The wireless communication device 104 may enter 920 semi non-DRx mode for the duration of the semi non-DRx timer 871b. The wireless communication device 104 may then switch from semi non-DRx mode and enter 906 DRx mode once the semi non-DRx timer 871b has expired 922.

FIG. 10 is a block diagram illustrating the radio blocks read by a wireless communication device 104 during semi non-DRx mode according to some embodiments of the present invention. Each 51-multiframe (MF) 1084a-e may have 51 frames (see 3GPP TS 45.002). Each 51-multiframe (MF) 1084 may be numbered in order from 00 to 50. While five 51-multiframes (MFs) 1084a-e are illustrated, it should be appreciated that as few as one and as many as n may be employed, where n represents an integer value. For example, 12, 35, 80, or 104 multiframes (MFs) may be employed in each cycle.

Different channels may be associated with each frame. For example, the frequency correction channel (FCCH) may associate with frames 00, 10, 30, and 40. The synchronization channel (SCH) may associate with frames 01, 11, 21, 31, and 41. The broadcast control channel (BCCH norm) may associate with frames 02, 03, 04, and 05. In some configurations, the optional broadcast control channel (BCCH ext) may associate with frames 06, 07, 08, and 09 (not shown).

In addition, the frames may be associated with a paging index 1086. There may be nine paging indexes 1086a-i associated with each 51-multiframe (MF) 1084a-e (The nine paging indexes are in addition to the first BCCH block).

For the example shown in FIG. 10, the wireless communication device 104 is assigned paging index 7 1086h. Thus, the wireless communication device 104 may monitor and read the radio block 1087 corresponding to paging index 7 1086h on every 51-multiframe (MF) 1084a-e. Because the wireless communication device 104 is in semi non-DRx mode, the wireless communication device 104 may also monitor and read the BCCH radio block 1085 on every 51-multiframe (MF) 1084a-e. If the network also supports the BCCH ext (extended), the wireless communication device 104 may also monitor and read the BCCH radio block corresponding to the BCCH ext on every 51-multiframe (MF) 1084a-e. The wireless communication device 104 may continue to read the radio blocks corresponding to its paging index 1086 and optionally the BCCH radio block(s) on every 51-multiframe (MF) 1084a-e until the semi non-DRx timer 871b has expired. At the point when the semi non-DRx timer 871b has expired, the wireless communication device 104 may switch to DRx mode (where only the radio block corresponding to its paging index on every nth 51-multiframe (MF) 1084a-e is read). The use of the semi non-DRx mode allows for faster connection assignments, such as downlink temporary block flow (TBF) assignments, while minimizing power consumption in the wireless communication device 104.

In some embodiments of the present invention, the wireless communication device 104 may monitor for pages more frequently than once per multiframe (MF) paging cycle 1084. For example, the wireless communication device 104 may monitor and read the radio block 1087 corresponding to more than one paging index 1086 per multiframe (MF) cycle 1084. In other words, the wireless communication device 104 may monitor for pages on a range of paging indexes 1086. The monitoring frequency may be static or may vary. For example, the wireless communication device 104 may monitor for pages according to one range of paging indexes 1086 for a first period of time, then the wireless communication device 104 may monitor for pages according to another range of paging indexes 1086 for a second period of time. These ranges may be dynamic. Thus, pages may be read more frequently in semi non-DRx mode than in non-DRx mode, and less frequently in semi non-DRx mode than in DRx mode.

In some embodiments of the present invention, the wireless communication device 104 may monitor for pages for a range of (MF) paging cycles 1084. For example, the wireless communication device 104 may monitor for pages for the first multiframe (MF) 1084a cycle, and the second multiframe (MF) 1084b cycle, but not for the third multiframe (MF) 1084c cycle. The wireless communication device 104 may repeat this pattern for the next three multiframe (MF) 1084 cycles. Alternatively, the wireless communication device 104 may use a different pattern for monitoring for pages. Thus, pages may be read more frequently in semi non-DRx mode than in non-DRx mode, and less frequently in semi non-DRx mode than in DRx mode.

In some embodiments of the present invention, the wireless communication device 104 may monitor broadcast control channel (BCCH) radio blocks 1085 over a range of multiframe (MF) cycles 1084. For example, the wireless communication device 104 may monitor the broadcast control channel (BCCH) radio blocks 1085 only once per five multiframe (MF) cycles 1084, while monitoring and reading the semi non-DRx paging block 1087 each of the five multiframe (MF) cycles 1084. In another example, the wireless communication device 104 may monitor the broadcast control channel (BCCH) radio blocks 1085 three times per five multiframe (MF) cycles 1084, such as every other multiframe (MF) cycles 1084. Thus, the broadcast control channel (BCCH) radio blocks may be read more frequently in semi non-DRx mode than in non-DRx mode, and/or less frequently in semi non-DRx mode than in DRx mode.

Figure 11:
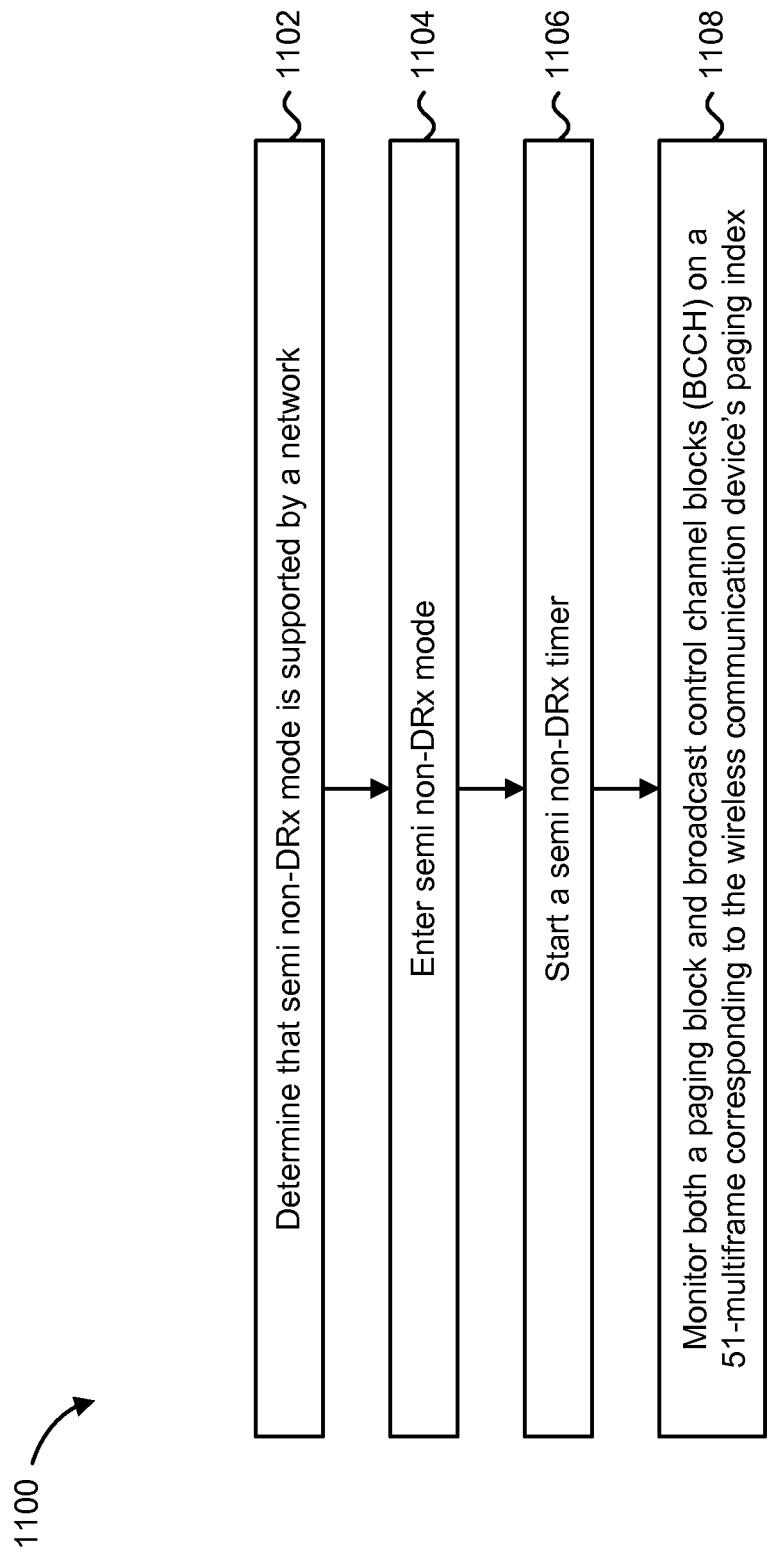
FIG. 11 is a flow diagram of a method for implementing semi non-DRx mode in a wireless communication device according to some embodiments of the present invention.

FIG. 11 is a flow diagram of a method 1100 for implementing semi non-DRx mode in a wireless communication device 104 according to some embodiments of the present invention. The method 1100 may be performed by a wireless communication device 104 and may utilize components and features discussed herein. The wireless communication device 104 may determine 1102 that semi non-DRx mode is supported by a network (e.g., wireless communication system 100).

If the network does support semi non-DRx mode, the wireless communication device 104 may enter 1104 semi non-DRx mode. The wireless communication device 104 may start 1106 a semi non-DRx timer. The wireless communication device 104 may then monitor 1108 a paging block corresponding to its paging index 881 and optionally broadcast control channel BCCH norm and optionally BCCH ext blocks on a 51-multiframe (MF).

Figure 12:
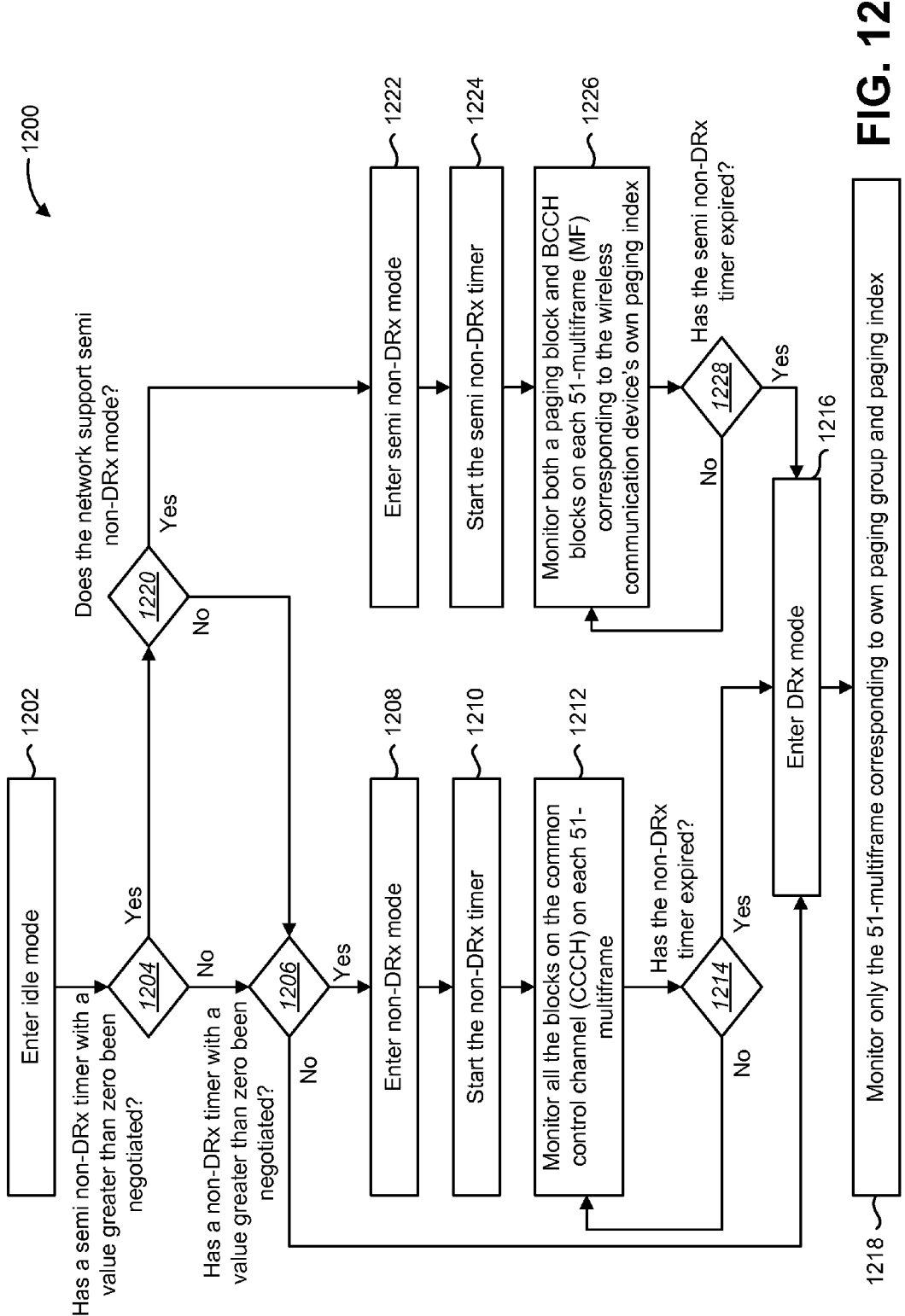
FIG. 12 is a flow diagram of a more detailed method for implementing semi non-DRx mode in a wireless communication device according to some embodiments of the present invention.

FIG. 12 is a flow diagram of a more detailed method 1200 for implementing semi non-DRx mode in a wireless communication device 104 according to some embodiments of the present invention. The method 1200 may be performed by a wireless communication device 104 and can utilize components and features discussed herein. The wireless communication device 104 may enter 1202 idle mode. The wireless communication device 104 may determine 1204 whether a semi non-DRx timer 871b with a value greater than zero (e.g., the semi non-DRx timer 871b is greater than zero) has been negotiated. The negotiated semi non-DRx timer 871b value may be the minimum of the timer value reported by the wireless communication device 104 and the value supported by the network (e.g., wireless communication system 100). If a semi non-DRx timer 871b with a value greater than zero has not been negotiated, the wireless communication device 104 may determine 1206 whether a non-DRx timer 869b with a value greater than zero has been negotiated. If a semi non-DRx timer 871b with a value greater than zero has been negotiated, the wireless communication device 104 may determine 1220 whether the network supports semi non-DRx mode.

If the network does support semi non-DRx mode, the wireless communication device 104 may enter 1222 semi non-DRx mode. The wireless communication device 104 may start 1224 the semi non-DRx timer 871b. The wireless communication device 104 may then monitor 1226 a paging block corresponding to its paging index 881 and optionally broadcast control channel BCCH norm and optionally BCCH ext blocks. The wireless communication device 104 may determine 1228 whether the semi non-DRx timer 871b has expired. If the semi non-DRx timer 871b has not expired, the wireless communication device 104 may continue to monitor 1226 a paging block corresponding to its paging index 881 and optionally broadcast control channel (BCCH) blocks on each 51-multiframe (MF) 1084. If the semi non-DRx timer 871b has expired, the wireless communication device 104 may enter 1216 DRx mode and monitor 1218 only a paging block on the 51-multiframe (MF) 1084 corresponding to the wireless communication device's 104 own paging group 880 and paging index 881.

If the network does not support semi non-DRx mode, the wireless communication device 104 may determine 1206 whether a non-DRx timer 869b with a value grater than zero has been negotiated. If a non-DRx timer 869b with a value greater than zero has not been negotiated, the wireless communication device 104 may enter 1216 DRx mode and monitor 1218 only the 51-multiframe (MF) 1084 corresponding to the wireless communication device's 104 own paging group 880 and paging index 881.

If a non-DRx timer 869b with a value greater than zero has been negotiated, the wireless communication device 104 may enter 1208 non-DRx mode. The wireless communication device 104 may start 1210 the non-DRx timer 869b. The wireless communication device 104 may then monitor 1212 all the blocks on the common control channel (CCCH) on each 51-multiframe (MF) 1084. The wireless communication device 104 may determine 1214 whether the non-DRx timer 869b has expired. If the non-DRx timer 869b has not expired, the wireless communication device 104 may continue to monitor 1212 all the blocks on the common control channel (CCCH) on each 51-multiframe (MF) 1084. If the non-DRx timer 869b has expired, the wireless communication device 104 may enter 1216 DRx mode and monitor 1218 only a paging block on the 51-multiframe (MF) 1084 corresponding to the wireless communication device's 104 own paging group 880 and paging index 881.

Figure 13:
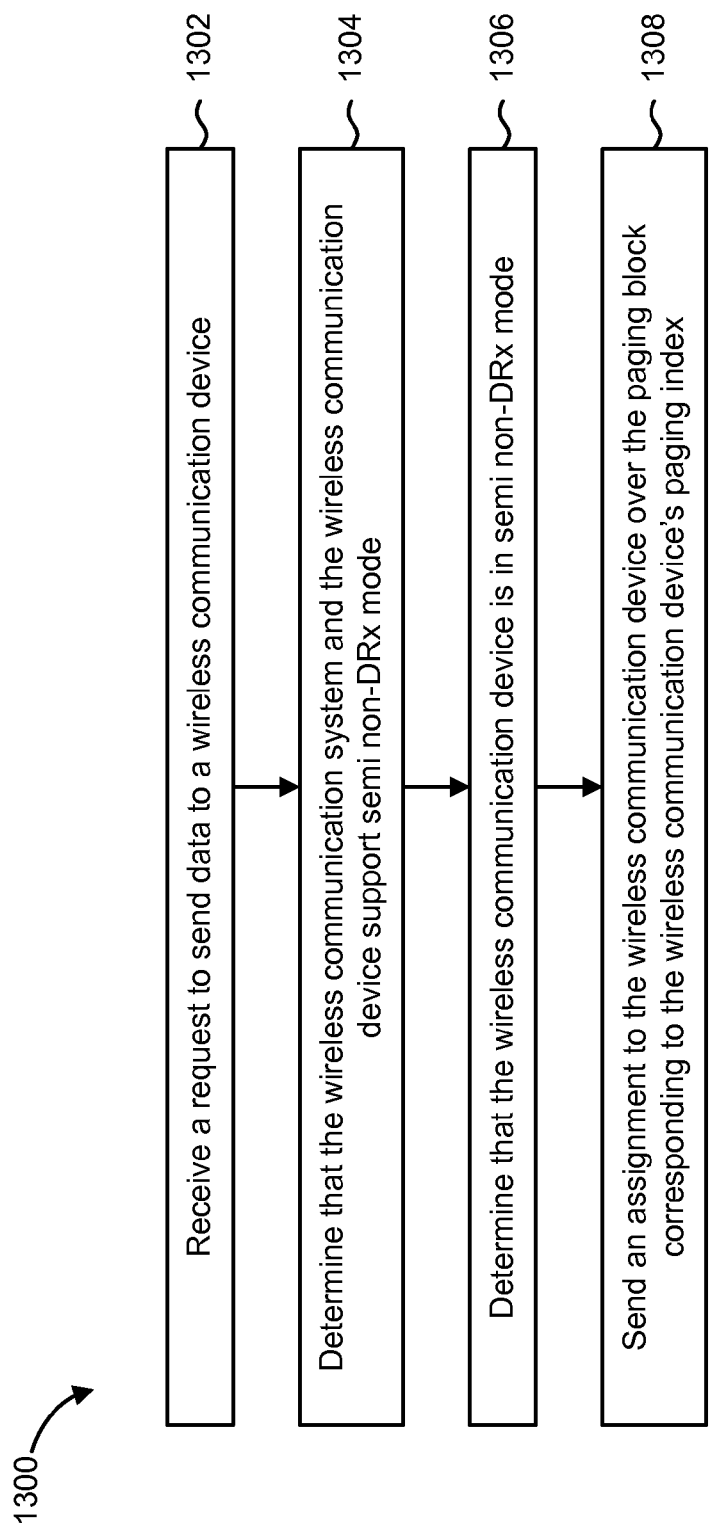
FIG. 13 is a flow diagram of a method for implementing semi non-DRx mode in a wireless communication network according to some embodiments of the present invention.

FIG. 13 is a flow diagram of a method 1300 for implementing semi non-DRx mode in a wireless communication network according to some embodiments of the present invention. The method 1300 may be performed by a base station 102. The base station 102 may receive 1302 a request to send data to a wireless communication device 104. In some configurations, the base station 102 may determine that the wireless communication device 104 is not in DRx mode.

The base station 102 may determine 1304 that the wireless communication system 100 and the wireless communication device 104 support semi non-DRx mode. The base station 102 may also determine 1306 that the wireless communication device 104 is in semi non-DRx mode. The base station 102 may send 1308 an assignment to the wireless communication device 104 over the radio block corresponding to the paging index 881.

Figure 14:
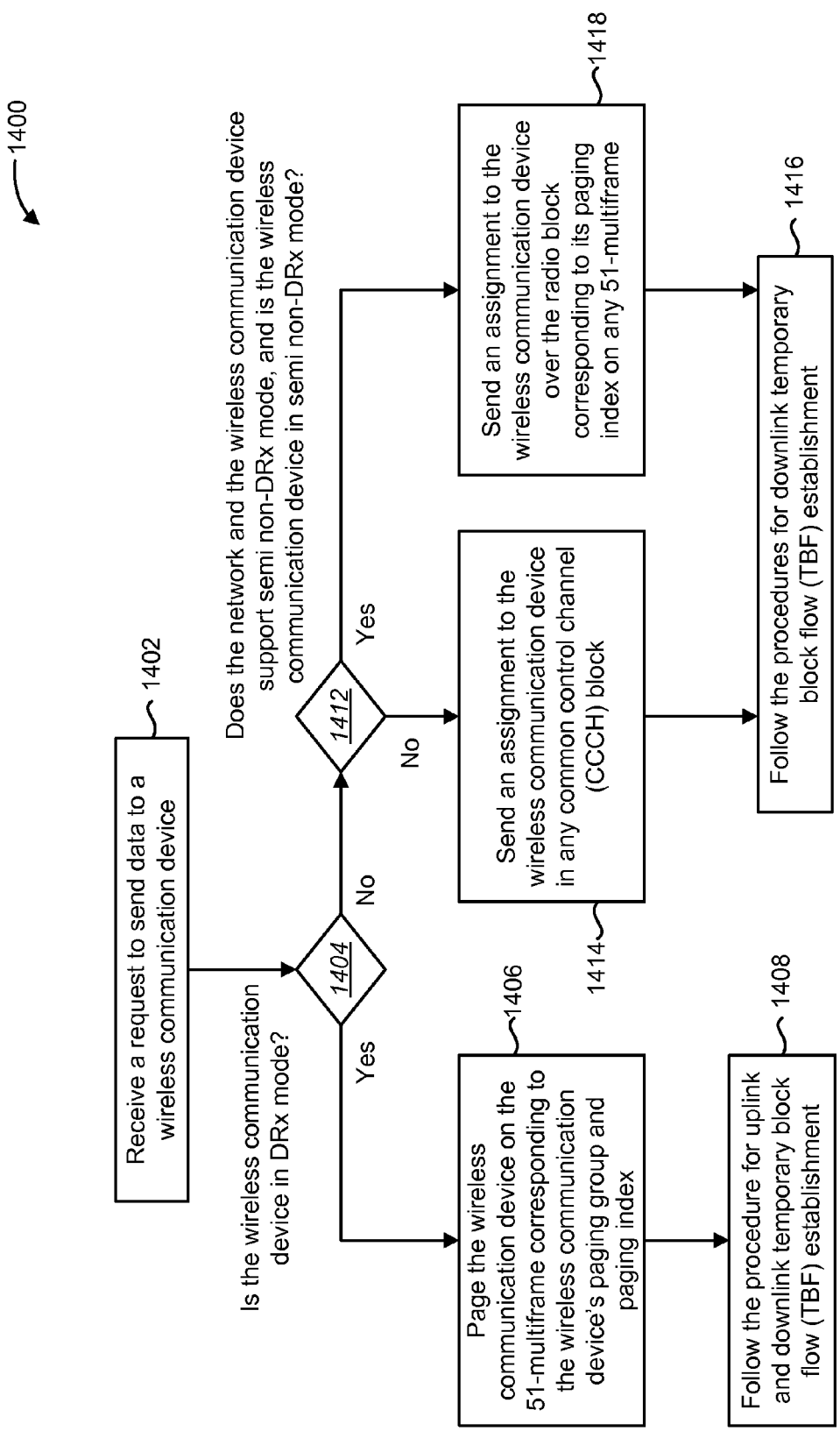
FIG. 14 is a flow diagram of a more detailed method for implementing semi non-DRx mode in a wireless communication network according to some embodiments of the present invention.

FIG. 14 is a flow diagram of a more detailed method 1400 for implementing semi non-DRx mode in a wireless communication network according to some embodiments of the present invention. The method 1400 may be performed by a base station 102. The base station 102 may receive 1402 a request to send data to a wireless communication device 104. The base station 102 may determine 1404 whether the wireless communication device 104 is in DRx mode. If the wireless communication device 104 is in DRx mode, the base station 102 may page 1406 the wireless communication device 104 on the 51-multiframe (MF) 1084 corresponding to the wireless communication device's 104 paging group 880 and paging index 881. The base station 102 may then follow 1408 the procedures for connection establishment, such as downlink uplink and downlink temporary block flow (TBF) establishment.

If the wireless communication device 104 is not in DRx mode, the base station 102 may determine 1412 whether the network and the wireless communication device 104 support semi non-DRx mode, and whether the wireless communication device 104 is in semi non-DRx mode. If the wireless communication device 104 is not in semi non-DRx mode and/or the network does not support semi non-DRx mode, the base station 102 may send 1414 an assignment to the wireless communication device 104 in any common control channel (CCCH) block. The base station 102 may then follow 1416 the procedures for downlink temporary block flow (TBF) establishment.

If the wireless communication device 104 and the network support semi non-DRx mode, and the wireless communication device is in semi non-DRx mode, the base station 102 may send 1418 an assignment to the wireless communication device 104 over the radio block corresponding to the wireless communication device's 104 paging index 881 on any 51-multiframe (MF) 1084. The base station 102 may then follow 1416 the procedures for downlink temporary block flow (TBF) establishment.

Figure 15:
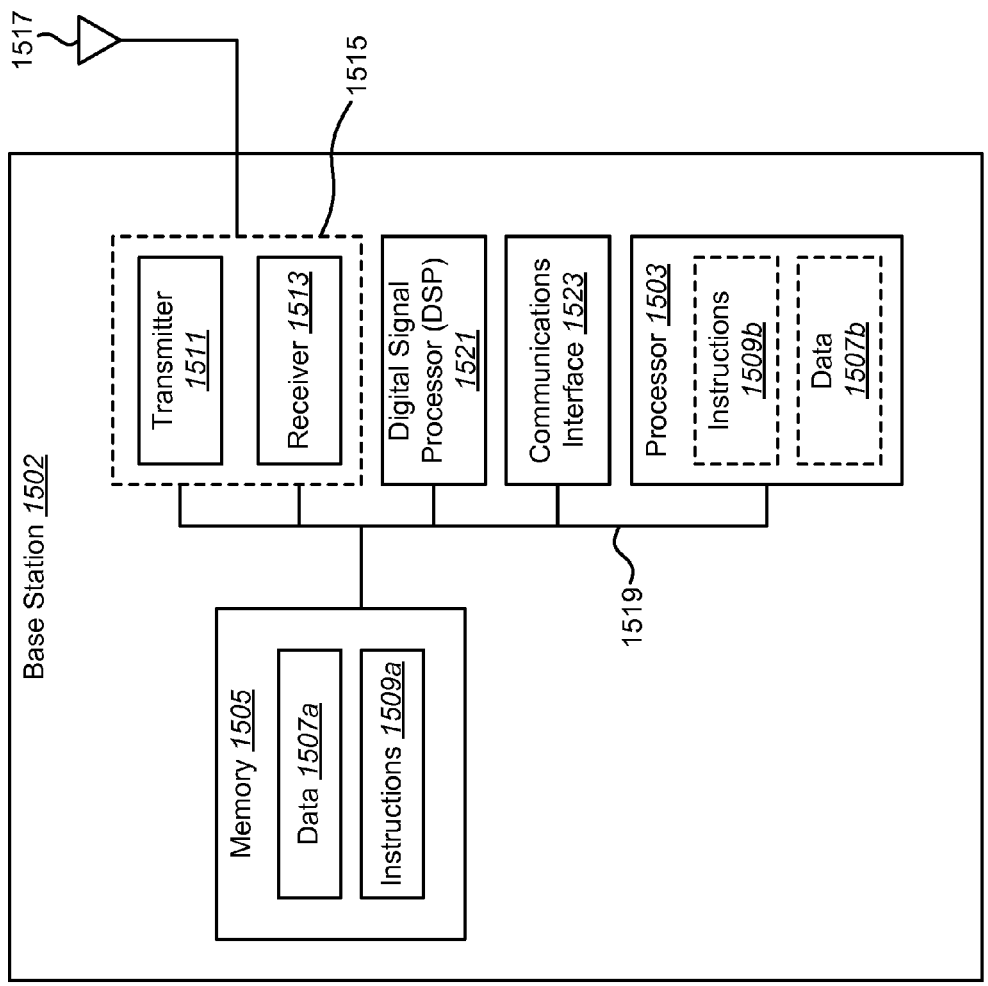
FIG. 15 illustrates certain components that may be included within a base station according to some embodiments of the present invention.

FIG. 15 illustrates certain components that may be included within a base station 1502 according to some embodiments of the present invention. A base station 1502 may also be referred to as, and may include some or all of the functionality of, an access point, a broadcast transmitter, a NodeB, an evolved NodeB, etc. For example, the base station 1502 may be the base station 102 of FIG. 1.

The base station 1502 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the base station 1502 of FIG. 15, in an alternative configuration, a combination of processors (e.g., an ARM and DSP) could be used.

The base station 1502 also includes memory 1505. The memory 1505 may be any electronic component capable of storing electronic information. The memory 1505 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1507*a* and instructions 1509*a* may be stored in the memory 1505. The instructions 1509*a* may be executable by the processor 1503 to implement the methods disclosed herein. Executing the instructions 1509*a* may involve the use of the data 1507*a* that is stored in the memory 1505. When the processor 1503 executes the instructions 1509*a*, various portions of the instructions 1509*b* may be loaded onto the processor 1503, and various pieces of data 1507*b* may be loaded onto the processor 1503.

The base station 1502 may also include a transmitter 1511 and a receiver 1513 to allow transmission and reception of signals to and from the base station 1502. The transmitter 1511 and receiver 1513 may be collectively referred to as a transceiver 1515. An antenna 1517 may be electrically coupled to the transceiver 1515. The base station 1502 may also include (not shown) multiple transmitters, multiple receivers, multiple transceivers and/or additional antennas.

The base station 1502 may include a digital signal processor (DSP) 1521. The base station 1502 may also include a communications interface 1523. The communications interface 1523 may allow a user to interact with the base station 1502.

The various components of the base station 1502 may be coupled together by one or more buses, which may include a power bus, a control signal bus, a status signal bus, a data bus, etc. For the sake of clarity, the various buses are illustrated in FIG. 15 as a bus system 1519.

Figure 16:
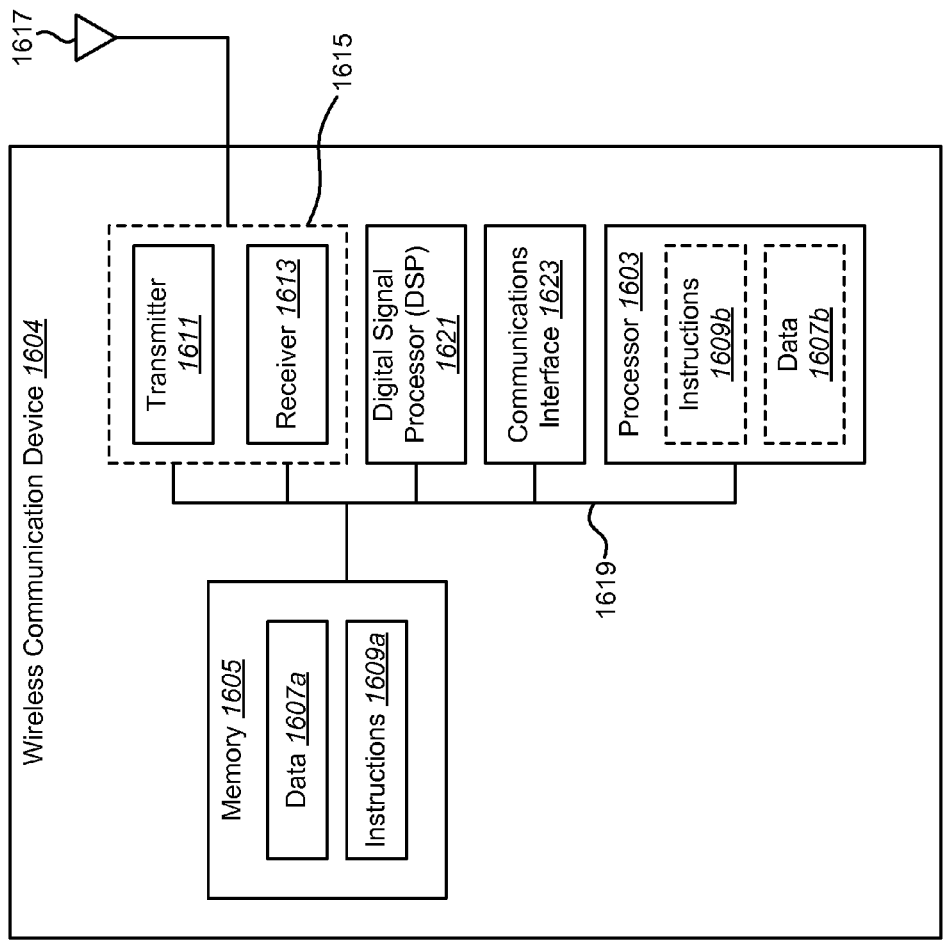
FIG. 16 illustrates certain components that may be included within a wireless communication device according to some embodiments of the present invention.

FIG. 16 illustrates certain components that may be included within a wireless communication device 1604 according to some embodiments of the present invention. The wireless communication device 1604 may be an access terminal, a mobile station, a user equipment (UE), etc. The wireless communication device 1604 includes a processor 1603. For example the wireless communication device 1604 may be the wireless communication device 104 of FIG. 1.

The processor 1603 may be a general purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the wireless communication device 1604 of FIG. 16, in an alternative configuration, a combination of processors (e.g., an ARM and DSP) could be used.

The wireless communication device 1604 also includes memory 1605. The memory 1605 may be any electronic component capable of storing electronic information. The memory 1605 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1607*a* and instructions 1609*a* may be stored in the memory 1605. The instructions 1609*a* may be executable by the processor 1603 to implement the methods disclosed herein. Executing the instructions 1609*a* may involve the use of the data 1607*a* that is stored in the memory 1605. When the processor 1603 executes the instructions 1609, various portions of the instructions 1609*b* may be loaded onto the processor 1603, and various pieces of data 1607*b* may be loaded onto the processor 1603.

The wireless communication device 1604 may also include a transmitter 1611 and a receiver 1613 to allow transmission and reception of signals to and from the wireless communication device 1604 via an antenna 1617. The transmitter 1611 and receiver 1613 may be collectively referred to as a transceiver 1615. The wireless communication device 1604 may also include (not shown) multiple transmitters, multiple antennas, multiple receivers and/or multiple transceivers.

The wireless communication device 1604 may include a digital signal processor (DSP) 1621. The wireless communication device 1604 may also include a communications interface 1623. The communications interface 1623 may allow a user to interact with the wireless communication device 1604.

The various components of the wireless communication device 1604 may be coupled together by one or more buses, which may include a power bus, a control signal bus, a status signal bus, a data bus, etc. For the sake of clarity, the various buses are illustrated in FIG. 16 as a bus system 1619.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 11-14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made without departing from the scope of the claims.

We claim:

1. A method for implementing semi non-DRx mode for a wireless communication device connected to a network via a General Packet Radio Services connection, the method comprising:
   determining that semi non-DRx mode is supported by the network;
   entering semi non-DRx mode; and
   monitoring a paging block on a multiframe corresponding to the wireless communication device's paging index, wherein the paging block covers a portion of the multiframe that includes multiple frames.

2. The method of claim 1, wherein the multiframe is a 51-multiframe.

3. The method of claim 1, wherein the paging block corresponding to the wireless communication device's paging group is determined by broadcast parameters.

4. The method of claim 1, wherein the paging block corresponding to the wireless communication device's paging group is determined by an international mobile subscriber identity of the wireless communication device.

5. The method of claim 1, further comprising:
   starting a semi non-DRx timer;
   determining that the semi non-DRx timer has expired;
   entering DRx mode;
   monitoring a broadcast control channel block on the multiframe; and
   monitoring only a radio block on the multiframe corresponding to the wireless communication device's paging index and paging group.

6. The method of claim 5, wherein the semi non-DRx timer is the minimum of a NON-DRX-TIMER-MAX parameter and a NON-DRX-TIMER parameter.

7. The method of claim 5, wherein the semi non-DRx timer is the minimum of a SEMI-NON-DRX-TIMER-MAX parameter and a SEMI-NON-DRX-TIMER parameter.

8. The method of claim 5, wherein the semi non-DRx timer is the minimum of a NON-DRX-TIMER-MAX parameter and a SEMI-NON-DRX-TIMER parameter.

9. The method of claim 5, wherein the semi non-DRx timer is the minimum of a SEMI-NON-DRX-TIMER-MAX parameter and a NON-DRX-TIMER parameter.

10. The method of claim 5, wherein the semi non-DRx timer is the minimum of a first semi non-DRx timer supported by the wireless communication device and a second semi non-DRx timer supported by the network.

11. The method of claim 5, wherein the semi non-DRx timer is provided by the network.

12. The method of claim 5, wherein the semi non-DRx timer is fixed.

13. The method of claim 5, wherein the semi non-DRx timer is a new timer.

14. The method of claim 1, further comprising receiving a Radio Link Control/Medium Access Control message to indicate the use of semi non-DRx mode.

15. The method of claim 1, wherein the method is performed by the wireless communication device.

16. A method for implementing semi non-DRx mode for a wireless communication network connected to a wireless communication device via a General Packet Radio Services connection, the method comprising:
receiving a request to send data to the wireless communication device;
determining that the wireless communication network and the wireless communication device support semi non-DRx mode;
determining that the wireless communication device is in semi non-DRx mode; and
sending an assignment to the wireless communication device over a paging block corresponding to the wireless communication device's paging index; and
sending pages to the wireless communication device over a paging block on a multiframe corresponding to the wireless communication device's paging index, wherein the paging block covers a portion of the multiframe that includes multiple frames.

17. The method of claim 16, wherein the assignment is sent on a multiframe.

18. The method of claim 17, wherein the multiframe is a 51-multiframe.

19. The method of claim 16, wherein the pages are sent on a multiframe.

20. The method of claim 16, further comprising following procedures for connection establishment.

21. The method of claim 16, wherein the method is performed by a base station.

22. The method of claim 16, further comprising maintaining a current state of the wireless communication device.

23. The method of claim 16, further comprising sending a Radio Link Control/Medium Access Control message to indicate the use of semi non-DRx mode.

24. A wireless device connected to a network via a General Packet Radio Services connection configured for implementing semi non-DRx mode, comprising:
a processor;
memory in electronic communication with the processor;
instructions stored in the memory, the instructions being executable by the processor to:
determine that semi non-DRx mode is supported by the network;
enter semi non-DRx mode; and
monitor a paging block on a multiframe corresponding to the wireless device's paging index, wherein the paging block covers a portion of the multiframe that includes multiple frames.

25. The wireless device of claim 24, wherein the multiframe is a 51-multiframe.

26. The wireless device of claim 24, wherein the paging block corresponding to the wireless device's paging group is determined by broadcast parameters.

27. The wireless device of claim 24, wherein the paging block corresponding to the wireless device's paging group is determined by an international mobile subscriber identity of the wireless device.

28. The wireless device of claim 24, wherein the instructions are further executable to:
start a semi non-DRx timer;
determine that the semi non-DRx timer has expired;
enter DRx mode;
monitor a broadcast control channel block on the multiframe; and
monitor only a radio block on the multiframe corresponding to the wireless device's paging index and paging group.

29. The wireless device of claim 28, wherein the semi non-DRx timer is the minimum of a NON-DRX-TIMER-MAX parameter and a NON-DRX-TIMER parameter.

30. The wireless device of claim 28, wherein the semi non-DRx timer is the minimum of a SEMI-NON-DRX-TIMER-MAX parameter and a SEMI-NON-DRX-TIMER parameter.

31. The wireless device of claim 28, wherein the semi non-DRx timer is the minimum of a NON-DRX-TIMER-MAX parameter and a SEMI-NON-DRX-TIMER parameter.

32. The wireless device of claim 28, wherein the semi non-DRx timer is the minimum of a SEMI-NON-DRX-TIMER-MAX parameter and a NON-DRX-TIMER parameter.

33. The wireless device of claim 28, wherein the semi non-DRx timer is the minimum of a first semi non-DRx timer supported by the wireless device and a second semi non-DRx timer supported by the network.

34. The wireless device of claim 28, wherein the semi non-DRx timer is provided by the network.

35. The wireless device of claim 28, wherein the semi non-DRx timer is fixed.

36. The wireless device of claim 28, wherein the semi non-DRx timer is a new timer.

37. The wireless device of claim 24, wherein the instructions are further executable to receive a Radio Link Control/Medium Access Control message to indicate the use of semi non-DRx mode.

38. The wireless device of claim 24, wherein the wireless device is a wireless communication device.

39. A wireless device in a network configured for implementing semi non-DRx mode, wherein a wireless communication device is connected to the network via a General Packet Radio Services connection, the wireless device comprising:
a processor;
memory in electronic communication with the processor; and
instructions stored in the memory, the instructions being executable by the processor to:
receive a request to send data to the wireless communication device;
determine that a network and the wireless communication device support semi non-DRx mode;
determine that the wireless communication device is in semi non-DRx mode; and
send an assignment to the wireless communication device over a paging block corresponding to the wireless communication device's paging index; and
send pages to the wireless communication device over a paging block on a multiframe corresponding to the wireless communication device's paging index, wherein the paging block covers a portion of the multiframe that includes multiple frames.

40. The wireless device of claim 39, wherein the instructions to send the assignment further comprises instructions to send the assignment on a multiframe.

41. The wireless device of claim 40, wherein the multiframe is a 51-multiframe.

42. The wireless device of claim 39, wherein the instructions to send the pages further comprises instructions to send the pages on a multiframe.

43. The wireless device of claim 39, wherein the instructions are further executable to follow procedures for connection establishment.

44. The wireless device of claim 39, wherein the wireless device is a base station.

45. The wireless device of claim 39, wherein the instructions are further executable to maintain a current state of the wireless communication device.

46. The wireless device of claim 39, wherein the instructions are further executable to send a Radio Link Control/Medium Access Control message to indicate the use of semi non-DRx mode.

47. A computer-program product for implementing semi non-DRx mode for a wireless communication device connected to a network via a General Packet Radio Services connection, the computer-program product comprising a non-transitory computer-readable medium having instructions thereon, the instructions comprising:
  code for causing the wireless communication device to determine that semi non-DRx mode is supported by the network;
  code for causing the wireless communication device to enter semi non-DRx mode; and
  code for causing the wireless communication device to monitor a paging block on a multiframe corresponding to the wireless communication device's paging index, wherein the paging block covers a portion of the multiframe that includes multiple frames.

48. The computer-program product of claim 47, wherein the multiframe is a 51-multiframe.

49. The computer-program product of claim 47, wherein the instructions further comprise:
  code for causing the wireless communication device to start a semi non-DRx timer;
  code for causing the wireless communication device to determine that the semi non-DRx timer has expired;
  code for causing the wireless communication device to enter DRx mode;
  code for causing the wireless communication device to monitor a broadcast control channel block on the multiframe; and
  code for causing the wireless communication device to monitor only a radio block on the multiframe corresponding to the wireless communication device's paging index and paging group.

50. The computer-program product of claim 49, wherein the semi non-DRx timer is the minimum of a SEMI-NON-DRX-TIMER-MAX parameter and a SEMI-NON-DRX-TIMER parameter.

51. The computer-program product of claim 49, wherein the semi non-DRx timer is the minimum of a first semi non-DRx timer supported by the wireless communication device and a second semi non-DRx timer supported by the network.

52. The computer-program product of claim 49, wherein the semi non-DRx timer is provided by the network.

53. The computer-program product of claim 49, wherein the semi non-DRx timer is fixed.

54. A computer-program product for implementing semi non-DRx mode for a wireless communication network connected to a wireless communication device via a General Packet Radio Services connection, the computer-program product comprising a non-transitory computer-readable medium having instructions thereon, the instructions comprising:
  code for causing a wireless device to receive a request to send data to the wireless communication device;
  code for causing the wireless device to determine that the wireless communication network and a wireless communication device support semi non-DRx mode;
  code for causing the wireless device to determine that the wireless communication device is in semi non-DRx mode;
  code for causing the wireless device to send an assignment to the wireless communication device over a paging block corresponding to the wireless communication device's paging index; and
  code for causing the wireless device to send pages to the wireless communication device over a paging block on a multiframe corresponding to the wireless communication device's paging index, wherein the paging block covers a portion of the multiframe that includes multiple frames.

55. The computer-program product of claim 54, wherein the code for causing the wireless device to send the assignment further comprises code for causing the wireless device to send the assignment on a multiframe.

56. The computer-program product of claim 55, wherein the multiframe is a 51-multiframe.

57. The computer-program product of claim 54, wherein the code for causing the wireless device to send pages further comprises code for causing the wireless device to send pages on a multiframe.

58. A wireless device connected to a network via a General Packet Radio Services connection, comprising:
  a communications interface for receiving and transmitting wireless data; and
  a processor operatively coupled to the communications interface, the processor being configured to:
    enter a semi non-DRx mode; and
    monitor pages of a paging block on a multiframe corresponding to a paging index of a wireless communication device, wherein the pages in semi non-DRx mode are read more frequently than in non-DRx mode and less frequently than in DRx mode, wherein the paging block covers a portion of the multiframe that includes multiple frames.

59. The wireless device of claim 58, wherein the processor is further configured to monitor pages of a broadcast control channel on a multiframe corresponding to a paging index of the wireless communication device, wherein the pages of the broadcast control channel are read more frequently in semi non-DRx mode than in non-DRx mode and less frequently than in DRx mode.

60. The wireless device of claim 58, wherein the multiframe is a 51-multiframe.

61. The wireless device of claim 58, wherein the processor is further configured to:
  start a semi non-DRx timer;
  determine that the semi non-DRx timer has expired; and
  enter one of non-DRx mode and DRx mode.

62. The wireless device of claim 61, wherein the semi non-DRx timer is provided by a network.

63. The wireless device of claim 61, wherein the semi non-DRx timer is fixed.

64. The wireless device of claim 58, wherein the wireless device is the wireless communication device.

65. A method for implementing semi non-DRx mode for a wireless communication device connected to a network via a General Packet Radio Services connection, the method comprising:
  entering a semi non-DRx mode; and
  monitoring pages of a paging block on a multiframe corresponding to a paging index of a wireless communication device, wherein the pages of a paging block are read more frequently in semi non-DRx mode than in non-DRx mode and less frequently than in DRx mode, wherein the paging block covers a portion of the multiframe that includes multiple frames.

66. The method of claim 65, further comprising monitoring pages of a broadcast control channel on a multiframe corresponding to a paging index of the wireless communication device, wherein the pages of a broadcast control channel are read more frequently in semi non-DRx mode than in non-DRx mode and less frequently than in DRx mode.

67. The method of claim 65, wherein the multiframe is a 51-multiframe.

68. The method of claim 65, further comprising:
starting a semi non-DRx timer;
determining that the semi non-DRx timer has expired; and
entering one of non-DRx mode and DRx mode.

69. The method of claim 68, wherein the semi non-DRx timer is provided by a network.

70. The method of claim 68, wherein the semi non-DRx timer is fixed.

71. The method of claim 65, wherein the method is performed by the wireless communication device.

72. A computer-program product for implementing semi non-DRx mode for a wireless communication device connected to a network via a General Packet Radio Services connection, the computer-program product comprising a non-transitory computer-readable medium having instructions thereon, the instructions comprising:
code for causing the wireless communication device to enter a semi non-DRx mode; and
code for causing the wireless communication device to monitor pages of a paging block on a multiframe corresponding to a paging index of the wireless communication device, wherein the pages of a paging block are read more frequently in semi non-DRx mode than in non-DRx mode and less frequently than in DRx mode, wherein the paging block covers a portion of the multiframe that includes multiple frames.

73. The computer-program product of claim 72, wherein the instructions further comprise code for causing the wireless communication device to monitor pages of a broadcast control channel on a multiframe corresponding to a paging index of the wireless communication device, wherein the pages of a broadcast control channel are read more frequently in semi non-DRx mode than in non-DRx mode and less frequently than in DRx mode.

74. The computer-program product of claim 72, wherein the multiframe is a 51-multiframe.

75. The computer-program product of claim 72, wherein the instructions further comprise:
code for causing the wireless communication device to start a semi non-DRx timer;
code for causing the wireless communication device to determine that the semi non-DRx timer has expired; and
code for causing the wireless communication device to enter one of non-DRx mode and DRx mode.

76. The computer-program product of claim 75, wherein the semi non-DRx timer is provided by a network.

77. The computer-program product of claim 75, wherein the semi non-DRx timer is fixed.

78. A wireless communication device connected to a network via a General Packet Radio Services connection configured for implementing semi non-DRx mode, comprising:
means for determining that semi non-DRx mode is supported by the network;
means for entering semi non-DRx mode; and
means for monitoring a paging block on a multiframe corresponding to the wireless communication device's paging index, wherein the paging block covers a portion of the multiframe that includes multiple frames.

79. The wireless communication device of claim 78, wherein the multiframe is a 51-multiframe.

80. The wireless communication device of claim 78, further comprising:
means for starting a semi non-DRx timer;
means for determining that the semi non-DRx timer has expired;
means for entering DRx mode;
means for monitoring a broadcast control channel block on the multiframe; and
means for monitoring only a radio block on the multiframe corresponding to the wireless communication device's paging index and paging group.

81. The wireless communication device of claim 80, wherein the semi non-DRx timer is the minimum of a SEMI-NON-DRX-TIMER-MAX parameter and a SEMI-NON-DRX-TIMER parameter.

82. The wireless communication device of claim 80, wherein the semi non-DRx timer is the minimum of a first semi non-DRx timer supported by the wireless communication device and a second semi non-DRx timer supported by the network.

83. The wireless communication device of claim 80, wherein the semi non-DRx timer is provided by the network.

84. The wireless communication device of claim 80, wherein the semi non-DRx timer is fixed.

85. A wireless device connected to a wireless communication device via a General Packet Radio Services connection configured for implementing semi non-DRx mode, comprising:
means for receiving a request to send data to the wireless communication device;
means for determining that the wireless communication network and the wireless communication device support semi non-DRx mode;
means for determining that the wireless communication device is in semi non-DRx mode; and
means for sending an assignment to the wireless communication device over a paging block corresponding to the wireless communication device's paging index; and
means for sending pages to the wireless communication device over a paging block on a multiframe corresponding to the wireless communication device's paging index, wherein the paging block covers a portion of the multiframe that includes multiple frames.

86. The wireless device of claim 85, wherein means for sending the assignment further comprises means for sending the assignment on a multiframe.

87. The wireless device of claim 86, wherein the multiframe is a 51-multiframe.

88. The wireless device of claim 85, wherein means for sending the pages further comprises means for sending the pages on a multiframe.

89. The wireless device of claim 85, further comprising means for maintaining a current state of the wireless communication device.

* * * * *